US012759308B2

(12) United States Patent
Taira et al.

(10) Patent No.: US 12,759,308 B2
(45) Date of Patent: Oct. 13, 2026

(54) LIQUID DISCHARGE APPARATUS

(71) Applicant: CANON KABUSHIKI KAISHA, Tokyo (JP)

(72) Inventors: Hiroshi Taira, Tokyo (JP); Takeshi Murase, Kanagawa (JP); Sae Mogi, Kanagawa (JP); Hiroto Kango, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 18/743,415

(22) Filed: Jun. 14, 2024

(65) Prior Publication Data

US 2024/0416664 A1 Dec. 19, 2024

(30) Foreign Application Priority Data

Jun. 16, 2023 (JP) ................................ 2023-099541
May 21, 2024 (JP) ................................ 2024-082897

(51) Int. Cl.
*B41J 2/18* (2006.01)
*B41J 2/165* (2006.01)
*B41J 2/175* (2006.01)
*B41J 2/21* (2006.01)

(52) U.S. Cl.
CPC ............ *B41J 2/18* (2013.01); *B41J 2/16505* (2013.01); *B41J 2/175* (2013.01); *B41J 2/2103* (2013.01); *B41J 2/2117* (2013.01)

(58) Field of Classification Search
CPC . B41J 2/18; B41J 2/16505; B41J 2/175; B41J 2/2103; B41J 2/2117; B41J 2/16508
USPC ........................................................... 347/29
See application file for complete search history.

(56) References Cited

U.S. PATENT DOCUMENTS 10,654,265 B2 5/2020 Fukaswa et al.
2011/0050793 A1* 3/2011 Kumagai ............ B41J 2/17509 347/85
2014/0168295 A1* 6/2014 Ichihara .............. B41J 2/17509 347/6
2017/0210126 A1* 7/2017 Kato ......................... B41J 2/18

FOREIGN PATENT DOCUMENTS

JP 2021-169224 A 10/2021

* cited by examiner

*Primary Examiner* — Jason S Uhlenhake
*Assistant Examiner* — Alexander D Shenderov
(74) *Attorney, Agent, or Firm* — Venable LLP

(57) ABSTRACT

A liquid discharge apparatus includes a liquid discharge head including a nozzle capable of discharging a liquid, a circulation mechanism configured to circulate the liquid supplied to the liquid discharge head, a heating element configured to perform temperature adjustment of the liquid circulated by the circulation mechanism, a temperature sensor configured to detect a temperature of the liquid circulated by the circulation mechanism, and a cap capable of capping the nozzle that discharges the liquid in the liquid discharge head. The circulation mechanism circulates the liquid based on a detection result of the temperature sensor in a state in which the nozzle is capped by the cap.

8 Claims, 28 Drawing Sheets

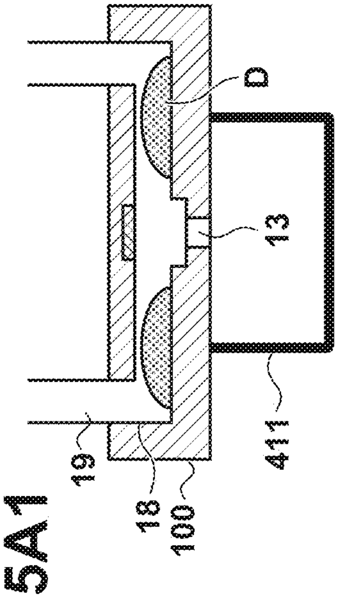
FIG. 25A1
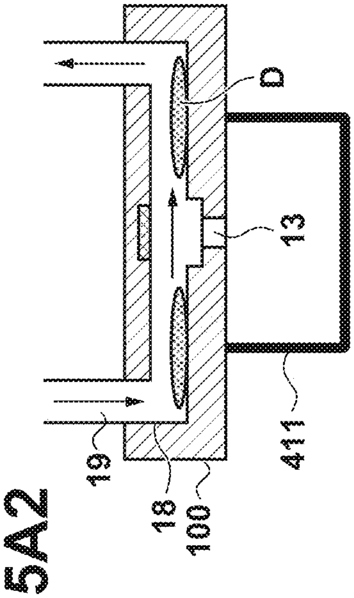
FIG. 25A2
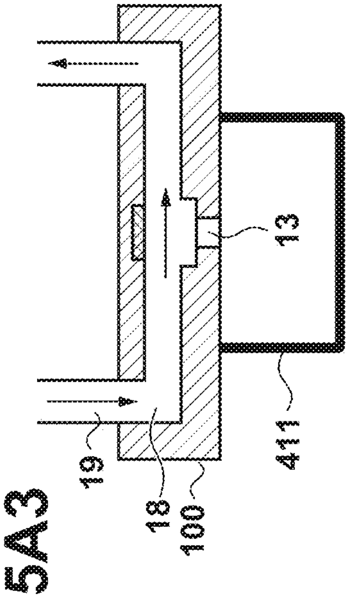
FIG. 25A3
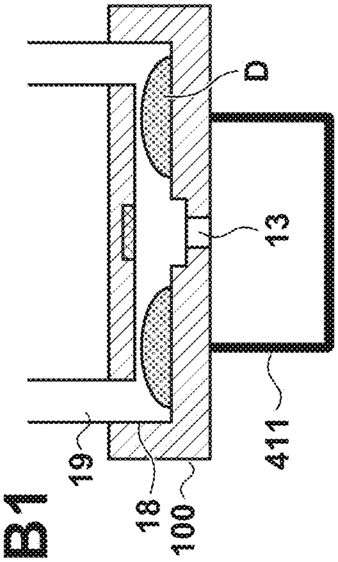
FIG. 25B1
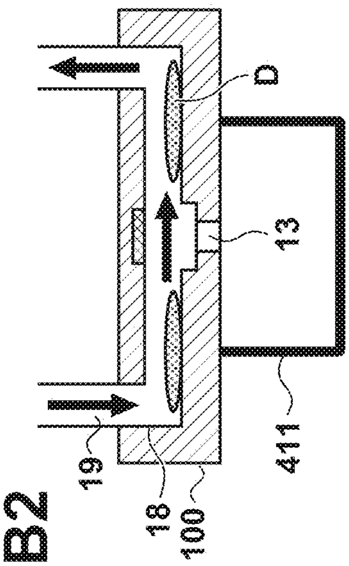
FIG. 25B2
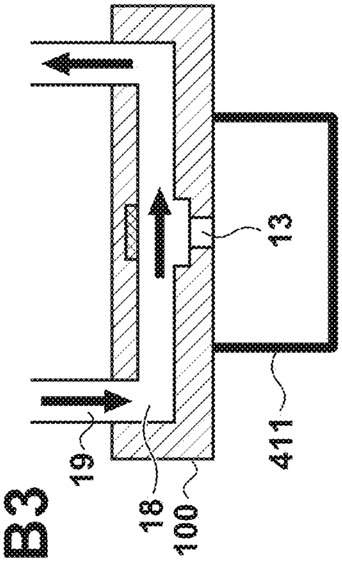
FIG. 25B3

LIQUID DISCHARGE APPARATUS

BACKGROUND OF THE INVENTION

Field of the Invention

The present invention relates to a liquid discharge apparatus.

Description of the Related Art

Among liquid discharge apparatuses represented by an inkjet printer, there are some apparatuses that include a circulation mechanism configured to circulate a liquid to be supplied to a liquid discharge head and can appropriately discharge the liquid while maintaining the quality of the liquid (see Japanese Patent Laid-Open No. 2021-169224).

There can generally be needed a technique for more appropriately maintaining the quality of the liquid to be supplied to the liquid discharge head and more appropriately discharging the liquid.

SUMMARY OF THE INVENTION

One of the aspects of the present invention provides a liquid discharge apparatus comprising a liquid discharge head including a nozzle capable of discharging a liquid, a circulation mechanism configured to circulate the liquid supplied to the liquid discharge head, a heating element configured to perform temperature adjustment for the liquid circulated by the circulation mechanism, a temperature sensor configured to detect a temperature for the liquid circulated by the circulation mechanism, and a cap capable of capping the nozzle that discharges the liquid in the liquid discharge head, wherein the circulation mechanism circulates the liquid based on a detection result of the temperature sensor in a state in which the nozzle is capped by the cap.

Further features of the present invention will become apparent from the following description of exemplary embodiments (with reference to the attached drawings).

BRIEF DESCRIPTION OF THE DRAWINGS

FIGS. 25A1 to 25B3 are schematic views showing a state in which a deposit in a discharge module is eliminated;

FIGS. 27A1 to 27B3 are schematic views showing a state in which a deposit in a discharge module is eliminated.

DESCRIPTION OF THE EMBODIMENTS

Figure 1:
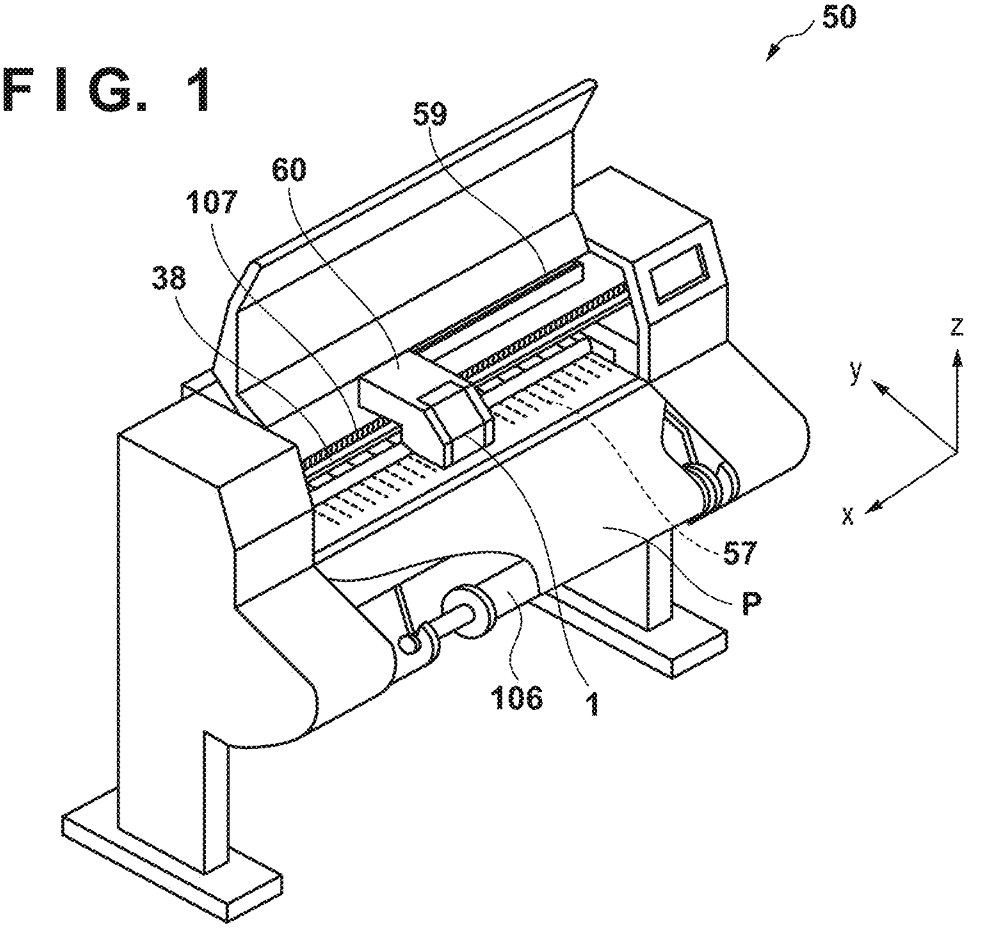
FIG. 1 is a view showing an example of the configuration of a liquid discharge apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following embodiments, a thermal liquid discharge apparatus will be exemplified, and an electrothermal transducer (heater) configured to discharge a liquid by generating bubbles by thermal energy will be exemplified as a discharge element used to discharge a liquid. However, the liquid discharge method is not limited to this example. For example, the liquid discharge head of the liquid discharge apparatus may employ another known discharge method such as a method of discharging a liquid using a piezoelectric element. That is, the discharge energy used to discharge a liquid may be in another mode. Also, a modification may be made for units (for example, a pressure adjustment unit such as a pump) to be exemplified below without departing from the scope.

First Embodiment

<Liquid Discharge Apparatus>

Figure 2A:
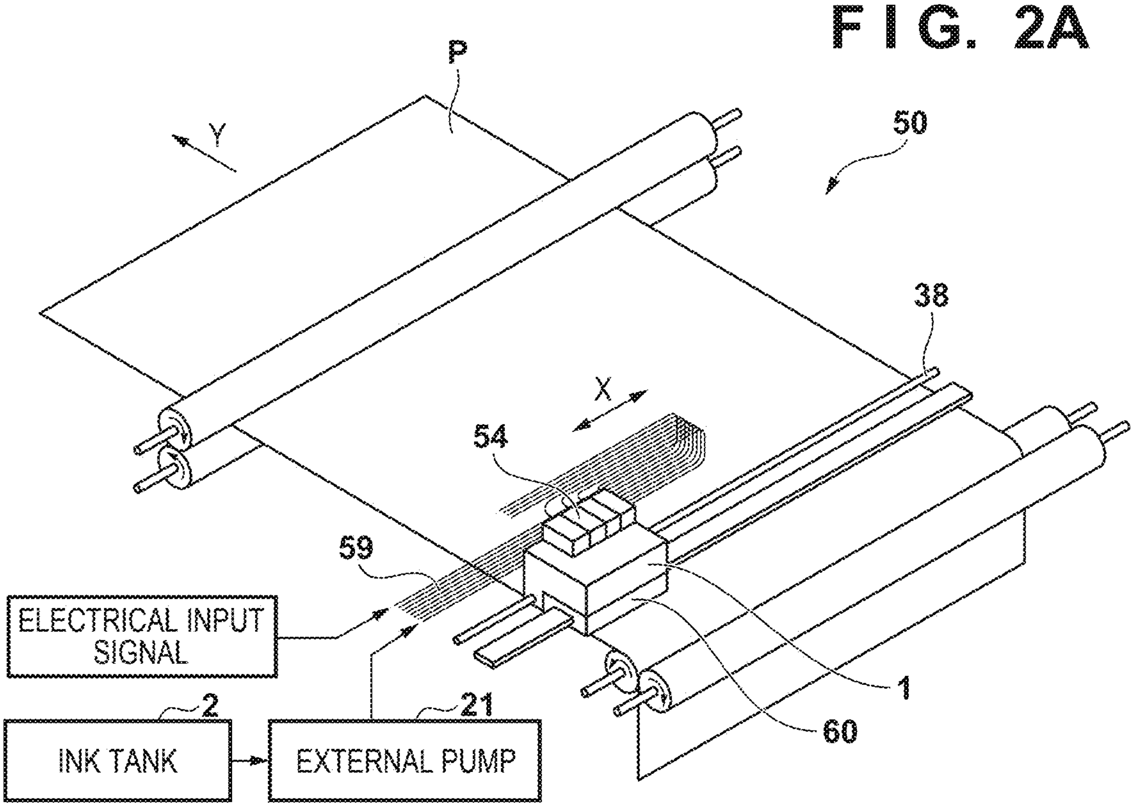
FIGS. 2A and 2B are views showing an example of the configuration of the liquid discharge apparatus.
Figure 2B:
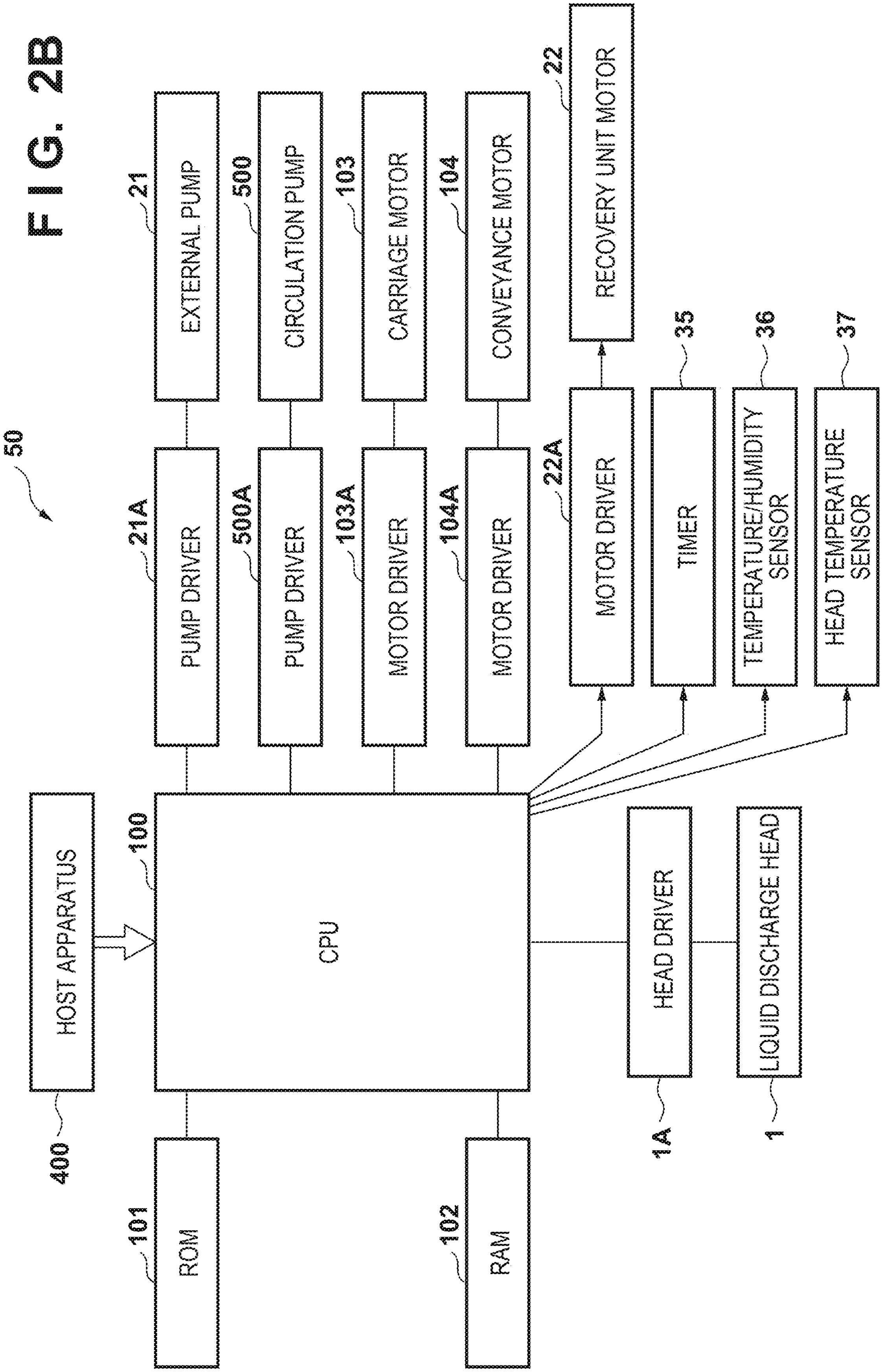

FIG. 1 is a perspective view of a liquid discharge apparatus 50 according to this embodiment. FIG. 2A is a perspective view showing a part of the internal configuration of the liquid discharge apparatus 50. FIG. 2B is a block diagram showing the system configuration of the liquid discharge apparatus 50.

In FIGS. 1 and 2A, to facilitate the explanation, an X direction corresponding to the left-right direction or the widthwise direction of the apparatus 50, a Y direction corresponding to the front-back direction or the depth direction of the apparatus 50, and a Z direction corresponding to the vertical direction or the height direction of the apparatus 50 are shown.

Here, the X, Y, and Z directions are shown in other structural drawings to be described later as well, and expressions such as “upper”, “lower”, “left”, and “right” in the following description indicate relative positional relationships between elements. Hence, for example, an upper surface (or a lower surface) may be expressed as one surface, and a lower surface (or an upper surface) may be expressed as the other surface.

The liquid discharge apparatus 50 includes a liquid discharge head 1, and executes printing on a print medium P by, while scanning the liquid discharge head 1 in a predetermined direction, discharging a liquid (typically ink, and this will sometimes be explained as “ink” in the following description) from each of nozzles arranged in the liquid discharge head 1.

The liquid discharge head 1 is called a serial head, but a line head capable of printing the whole region of the print medium P in the widthwise direction at once may be used. In the case of the serial head, a flexible wiring board is used for wirings configured to supply a driving signal for discharging a liquid, a control vibration for adjusting the temperature of the head 1, and the like, and a controller configured to perform driving control of the head 1 can be electrically connected to the flexible wiring board.

Here, “printing” indicates forming an image by discharging a liquid to the print medium P, and the concept of the image can typically include a character, a symbol, a graphic, and a photo. From this viewpoint, the liquid discharge apparatus 50 is also expressed as a printing apparatus, and can also be expressed as an inkjet printer in this embodiment in which ink is used as the liquid. Similarly, the liquid discharge head 1 can also be expressed as a printhead. A paper material can typically be used as the print medium P, but another sheet-shaped medium may be used.

As shown in FIGS. 1 and 2A, the liquid discharge apparatus 50 further includes a carriage 60, a guide shaft 38, a platen 57, an ink supply tube 59, a spool 106, and an encoder 107.

As shown in FIG. 2B, the liquid discharge apparatus 50 further includes a Central Processing Unit (CPU) 100, a Read Only Memory (ROM) 101, and a Random Access Memory (RAM) 102. The liquid discharge apparatus 50 further includes a head driver 1A, an external pump 21, a pump driver 21A, a circulation pump 500, a pump driver 500A, a carriage motor 103, a motor driver 103A, a conveyance motor 104, and a motor driver 104A. Also, the liquid discharge apparatus 50 further includes a recovery unit motor 22, a motor driver 22A, a timer 35, a temperature/humidity sensor 36, and a head temperature sensor 37.

The spool 106 holds the print medium P, and conveys the print medium P in the Y direction based on a conveyance roller that rotates by driving of the conveyance motor 104. The carriage 60 has the liquid discharge head 1 detachably mounted thereon, and can move along the guide shaft 38 extending in the X direction. The carriage 60 reciprocally moves and scans the liquid discharge head 1 in the X direction by driving of the carriage motor 103. The scan is performed at a speed of 40 inches per see at a timing at which ink dots have a resolution of 600 dpi (dot per inch).

The print medium P is sandwiched between a paper feed roller and a pinch roller and conveyed up to a position corresponding to the scan region of the liquid discharge head 1 on the platen 57, that is, a print position by the liquid discharge head 1. In a nonprinting operation (a state in which a printing operation is not actually performed), normally, the nozzle surface of the liquid discharge head 1 is capped by a cap 411 of a recovery unit 23 shown in FIG. 3. Hence, at the time of the printing operation, capping by the cap 411 is canceled before the start of the printing operation, and the liquid discharge head 1 is then scanned by the carriage 60.

During the scan of the liquid discharge head 1 by the carriage 60, the liquid discharge head 1 performs a discharge operation of discharging the liquid from each nozzle at a timing according to a position signal obtained from the encoder 107. By the scan of one time, printing in a width (band width) corresponding to the nozzle array range is performed on the print medium P. When such scan of one time and conveyance of the print medium P are alternately repeated, printing on one print medium P is completed. Printing on the next print medium P can be performed as needed in accordance with the same procedure as described above.

As another embodiment, printing for the band width may be performed by a plurality of times of scan, may be performed in both the forward path and the return path of the head 1, and may be performed by printing in two or more forward paths and two or more return paths (so-called multi-pass printing).

Note that the power of the carriage motor 103 can be transmitted to the carriage 60 via a carriage belt, but a known power transmission mechanism such as a structure including a lead screw connected to the carriage motor 103 and a slider engageable with a groove thereof may be employed.

To the liquid discharge head 1, ink is supplied from an ink tank 2 (see FIG. 9) attached to the apparatus 50 via the ink supply tube 59 connected to the carriage 60. The supply of ink may be performed circumstantially by a pressurization unit, or may be performed using a negative pressure of a suction pump during capping of the nozzle surface of the liquid discharge head 1 by the cap 411 of the recovery unit 23.

The liquid discharge apparatus 50 is a printer supporting color printing, and the liquid discharge head 1 can discharge inks of a plurality of colors. However, the liquid discharge head 1 may be able to discharge an ink of a single color. If the liquid discharge head 1 can discharge inks of a plurality of colors, a plurality of heads 1 capable of discharging these may be mounted together on the carriage 60, or may be individually mounted on carriages 60.

Figure 4:
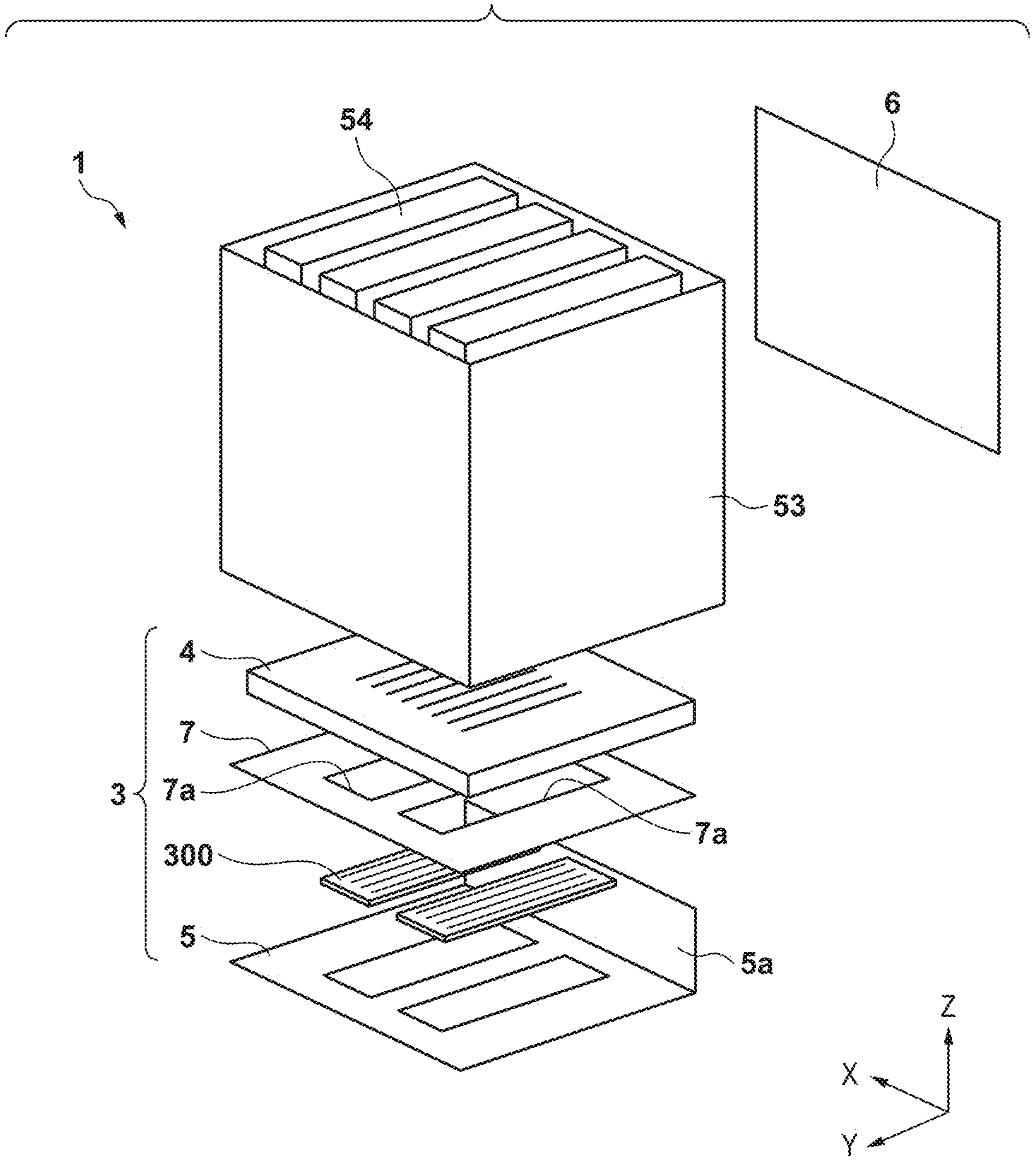
FIG. 4 is an exploded perspective view of a liquid discharge head.

As shown in FIG. 4, the liquid discharge head 1 includes a discharge unit 3 and a circulation unit 54. As will be described later in detail, the discharge unit 3 is provided with a plurality of orifices (nozzle holes) and discharge elements that generate discharge energy used to discharge the liquid from the orifices.

Also, as will be described later in detail, the circulation unit 54 is used to circulate ink. To the circulation unit 54, the ink stored in the ink tank 2 is supplied by the external pump 21 via the ink supply tube 59. The circulation unit 54 can be provided for each type of liquid (ink color). A plurality of circulation units 54 may be provided for the same type of liquid.

Referring to FIG. 2B, the CPU 100 performs driving control of each element of the liquid discharge apparatus 50 based on a program stored in the ROM 101. The ROM 101 can also store multivalued tone data obtained as an intermediate product in processing, a multi-pass task, and the like. The RAM 102 can function as a work area when the CPU 100 executes processing.

For example, the CPU 100 receives image data from an external host apparatus 400 and controls the head driver 1A, thereby performing driving control of the liquid discharge head 1.

In addition, the CPU 100 further performs driving control of a driver in each actuator provided in the liquid discharge apparatus 50. For example, the CPU 100 can perform driving control of the motor driver 103A of the carriage motor 103 configured to move the carriage 60, and driving control of the motor driver 104A of the conveyance motor 104 configured to convey the print medium P.

Similarly, the CPU 100 further performs driving control of the pump driver 500A configured to drive the circulation pump 500, driving control of the pump driver 21A of the external pump 21, and driving control of the motor driver 22A of the recovery unit motor 22. The recovery unit motor 22 is mounted in the recovery unit 23, and operates wiper guides 423 or a suction pump 413 (to be described later) by switching the driving target by a cam shaft (see FIG. 3).

The CPU 100 can function as a system control unit that controls the whole system of the liquid discharge apparatus 50 together with the ROM 101 and the RAM 102 or simply as a control unit.

As will be described later in detail, the timer 35 measures time. The temperature/humidity sensor 36 detects the temperature and the humidity in the use environment of the main body of the liquid discharge apparatus 50. The head temperature sensor 37 detects the temperature of the liquid discharge head 1.

<Recovery Unit>

Figure 3:
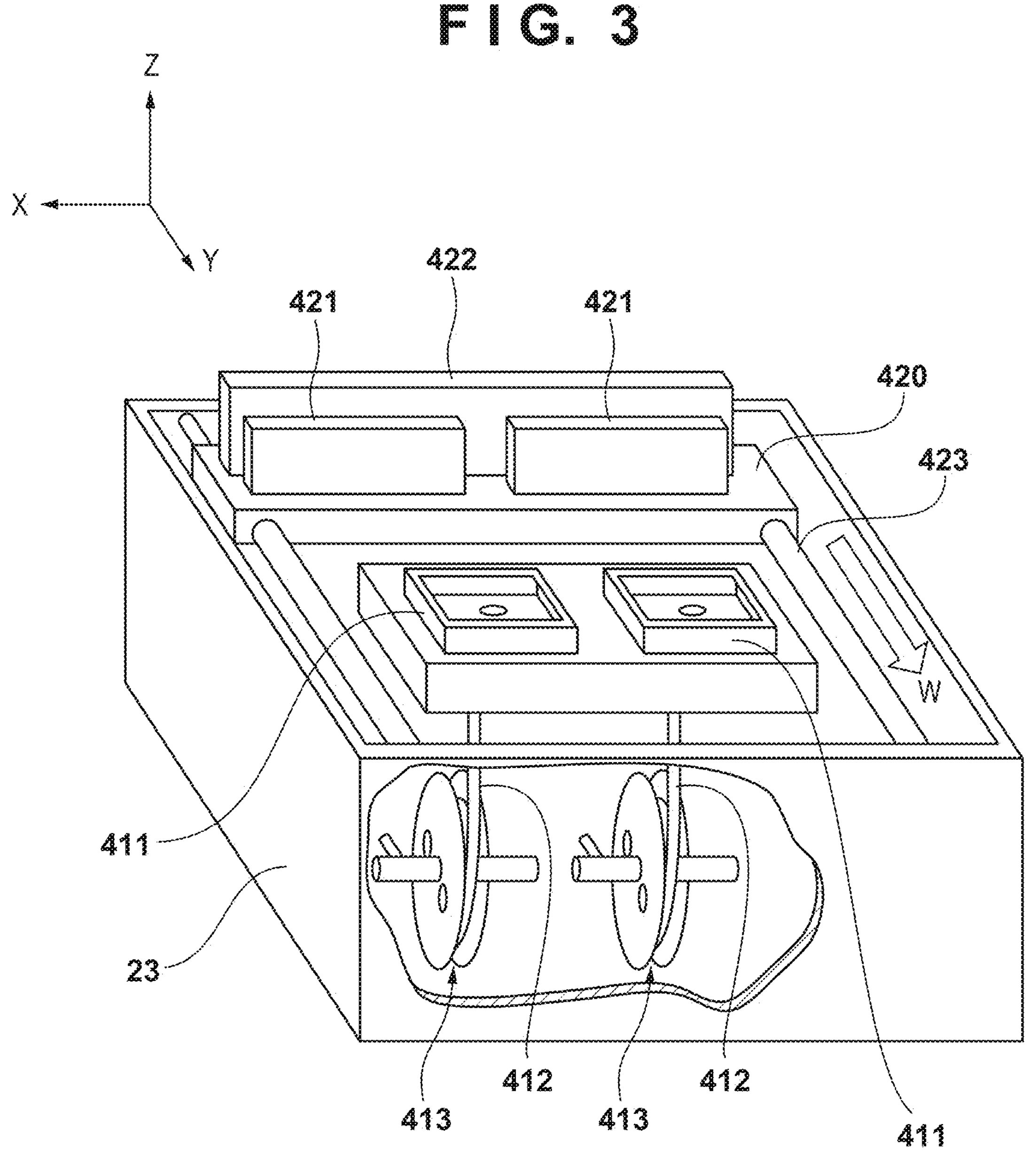
FIG. 3 is a view showing an example of the configuration of a recovery unit.

FIG. 3 is a schematic view showing an example of the configuration of the recovery unit 23. The cap 411 is supported such that it can be lifted by a lifting mechanism (not shown) (the position of the cap 411 when raised is a rise position, and the position of the cap 411 when lowered is a lowering position). At the rise position, the cap 411 contacts the liquid discharge head 1 and covers the nozzle surface of the liquid discharge head 1, thereby performing capping.

In the nonprinting operation, the cap 411 caps the nozzle surface of the liquid discharge head 1. This can suppress drying or evaporation of ink in the nozzles of the liquid discharge head 1. Also, the ink can be sucked from the nozzles by driving the suction pump 413.

In the printing operation, the cap 411 is located at the lowering position, and this can avoid interference with the liquid discharge head 1 that moves together with the carriage 60. In a state in which the cap 411 has moved to the lowering position, when moving to a position facing the cap 411, the liquid discharge head 1 can perform preliminary discharge (an operation of preliminarily discharging a liquid before execution of printing such that printing can appropriately be implemented) to the cap 411.

As shown in FIG. 3, on the upper surface of the recovery unit 23, two wipers 421 configured to wipe two chips on the nozzle surface, and a wiper 422 configured to wipe the whole nozzle surface (the whole region of the nozzle array) are arranged. The wipers 421 and 422 can each also be expressed as a wiper blade.

The wipers 421 and 422 can be fixed to a wiper holder 420. The wiper holder 420 can move in a W direction (the nozzle array direction, that is, a direction substantially parallel to the Y direction) along the wiper guides 423. When the liquid discharge head 1 is located at a standby position, the wipers 421 and 422 contact the nozzle surface, and the wiper holder 420 moves in the W direction, thereby performing a wiping operation. When the wiping operation is ended, the carriage 60 is retreated, and the wiper holder 420 is then moved. Thus, the wipers 421 and 422 return to the original position (the position before the wiping operation, that is, the initial position).

The wipers 421 and 422 can each be formed by an elastic member such as rubber, but may be made of a porous material capable of absorbing ink, or may be formed by a vacuum wiper capable of sucking the nozzle surface. Also, the wiping operation is performed during movement of the wipers 421 and 422 in one direction, but may be performed during movement in both directions. The wiping direction is the nozzle array direction, but may be a direction crossing (substantially orthogonal to) this.

Since the wiping operation need only be performed by relatively moving the wipers 421 and 422 and the nozzle surface, the wipers 421 and 422 may be fixed, and the nozzle surface may be moved relatively to the wipers 421 and 422.

Note that the wipers 421 and 422 or other several wiping members may divisionally be arranged in a plurality of recovery units 23, or may be configured such that the wiping directions may be different from each other.

The suction pump 413 is provided in the recovery unit 23. The suction pump 413 is driven in a state in which the cap 411 caps the nozzle surface of the liquid discharge head 1 to substantially tightly close the nozzles, and thus generates a negative pressure in the nozzles, thereby performing a suction operation of sucking ink from the nozzles. The suction operation can be performed when filling ink from the ink tank 2 into the liquid discharge head 1 (at the time of initial filling) and/or when sucking and removing foreign substances such as dust, sticking matters, and bubbles in the nozzles (at the time of suction recovery).

As the suction pump 413, a tube pump can be used (this can be expressed as the tube pump 413 hereinafter). The tube pump 413 includes a curved surface holding portion that holds (at least a part of) a tube 412 along it, a roller capable of pressing the held tube 412, and a roller support portion that rotatably supports the roller. The tube pump 413 rotates the roller support portion in a predetermined direction, and rotates the roller while pressing the tube 412, thereby generating a negative pressure in the cap 411 and performing the suction operation. The thus sucked ink is discharged to a waste ink absorber (not shown) via the tube 412.

When the liquid discharge head 1 performs preliminary discharge to the cap 411, the suction operation can be performed to discharge the ink accepted by the cap 411 by the preliminary discharge. That is, if the ink held in the cap 411 upon preliminary discharge reaches a predetermined amount, the suction pump 413 is driven, thereby discharging the ink held in the cap 411 to the waste ink absorber via the tube 412.

Note that the wiping operation by the wipers 421 and 422 may be expressed as a wiping recovery operation, and the suction operation by the suction pump 413 may be expressed as a suction recovery operation. The wiping operation and the suction operation may be expressed as a recovery operation together.

Figure 5A:
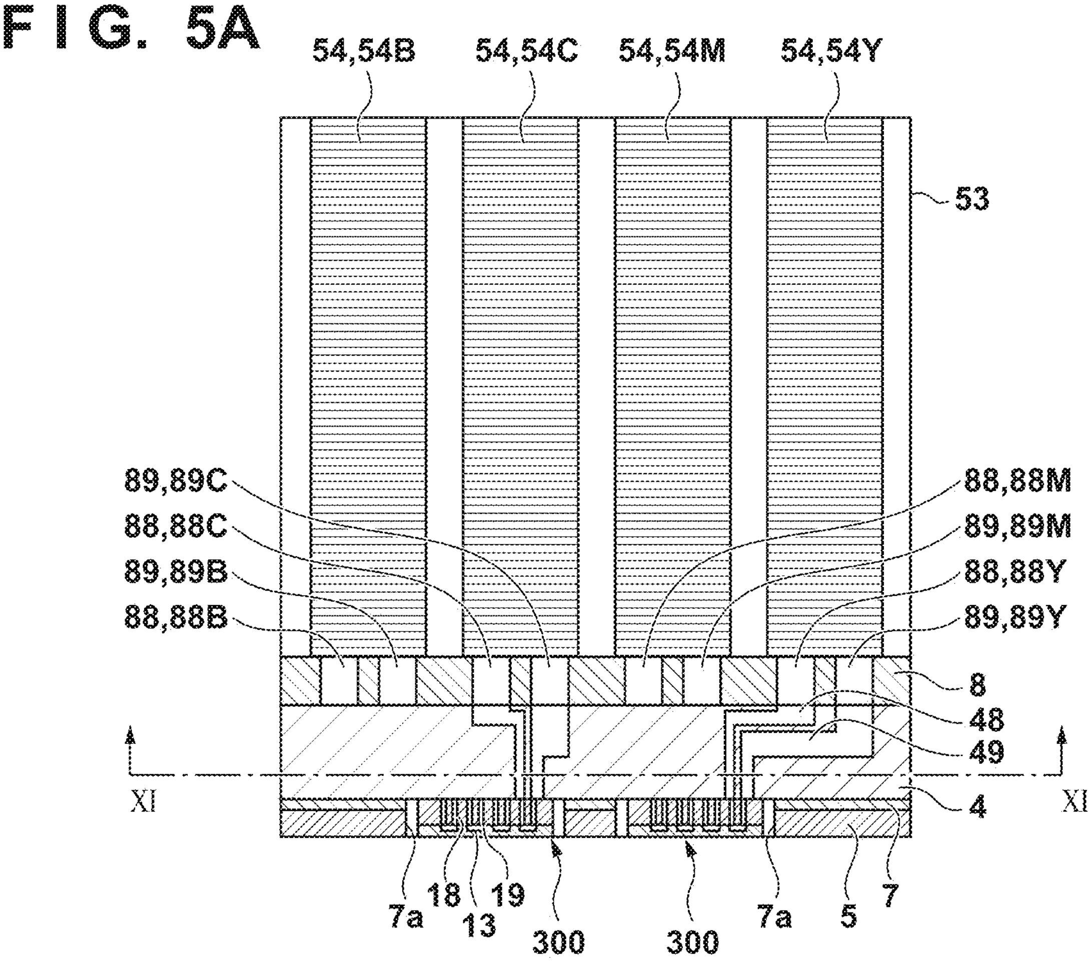
FIGS. 5A and 5B are sectional schematic views showing an example of the structure of the liquid discharge head.
Figure 5B:
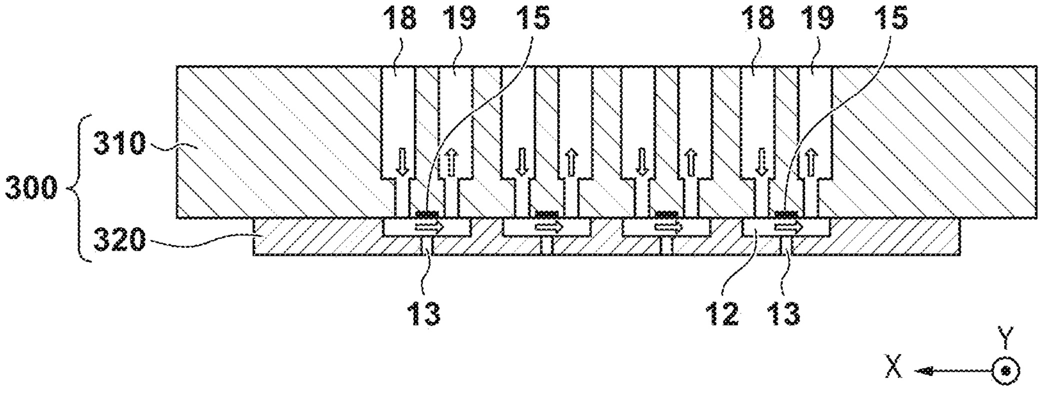

FIG. 4 is an exploded perspective view of the liquid discharge head 1. FIGS. 5A and 5B are sectional schematic views concerning the structure of the liquid discharge head 1. FIG. 5A is a sectional view of the entire liquid discharge head 1, and FIG. 5B is an enlarged sectional view of a discharge module thereof.

As described above, the liquid discharge head 1 includes the circulation unit 54, and the discharge unit 3 configured to discharge ink supplied from the circulation unit 54 to the print medium P. In this embodiment, the liquid discharge head 1 is positioned by a positioning portion that can be provided in the carriage 60, and can be connected and fixed to the carriage 60 by an electrical connecting portion. Thus, the liquid discharge head 1 discharges ink to the print medium P while scanning in the X direction by movement of the carriage 60, thereby performing printing.

The ink supply tube 59 is connected to the external pump 21 (see FIG. 1). A liquid connector (not shown) can be provided at the distal end of the ink supply tube 59. If the liquid discharge head 1 is mounted in the liquid discharge apparatus 50, the liquid connector can be inserted and connected to a liquid connector insertion port (not shown) provided in a housing 53 of the liquid discharge head 1. This forms an ink supply path from the ink tank 2 to the liquid discharge head 1 via the external pump 21.

In this embodiment, four types of inks C, M, Y, Bk, and W are used. In this embodiment, the liquid discharge head 1 is divided into the discharge head 1 that discharges the C, M, Y, and Bk inks and the discharge head 1 that discharges the W (white) ink. The discharge head 1 that discharges the C, M, Y, and Bk inks will be described hereinafter, and the discharge head 1 that discharges the W ink has the same configuration. For this reason, four sets of ink tanks 2, external pumps 21, ink supply tubes 59, and circulation units 54 are provided in correspondence with the four types of inks, and four ink supply paths corresponding to the inks are formed independently of each other. Thus, the liquid discharge apparatus 50 according to this embodiment is provided with an ink supply system that supplies ink from the ink tank 2 outside the liquid discharge head 1. In this embodiment, two discharge heads are provided. However, the C, M, Y, Bk, and W inks may be discharged from one discharge head.

Note that in this embodiment, the liquid discharge apparatus 50 does not include an ink recovery system that recovers ink in the liquid discharge head 1 to the ink tank 2.

In FIG. 5A, a circulation unit corresponding to the Bk color ink is defined as a circulation unit 54B, and similarly, circulation units corresponding to the C, M, and Y color inks are defined as circulation units 54C, 54M, and 54Y, respectively. The circulation units 54B, 54C, 54M, and 54Y have substantially the same configuration, and will simply be referred to as the circulation unit 54 if these are not particularly discriminated in the following description.

As shown in FIGS. 4 and 5A, the discharge unit 3 includes two discharge modules 300, a first support member 4, a second support member 7, an electric wiring member (electric wiring tape) 5, and an electric contact substrate 6. As shown in FIG. 5B, the discharge module 300 includes a silicon substrate 310 having a thickness of about 0.5 to 1.0 mm, and a plurality of discharge elements 15 provided on the lower surface of the silicon substrate 310. The discharge element 15 is an electrothermal transducer (heater), as described above, and power can be supplied to these via electric wires formed in the silicon substrate 310 using a known semiconductor process.

An orifice forming member 320 is arranged on the lower surface of the silicon substrate 310. In the orifice forming member 320, a plurality of pressure chambers 12 corresponding to the plurality of discharge elements 15, and a plurality of orifices 13 configured to discharge ink can be formed by photolithography.

Also, in the silicon substrate 310, individual supply channels 18 and individual recovery channels 19 communicating with the pressure chambers 12 are formed. In this embodiment, the single discharge module 300 is configured to discharge two types of inks. For example, of the two discharge modules 300 shown in FIG. 5A, one discharge module 300 shown on the left side discharges the Bk color ink and the C color ink, and the other discharge module 300 shown on the right side discharges the M color ink and the Y color ink.

Furthermore, in this example, two orifice arrays extending in the Y direction are formed in correspondence with one color ink, and the pressure chamber 12, the individual supply channel 18, and the individual recovery channel 19 are formed for each of the plurality of orifices 13 forming the arrays.

Ink supply ports 311 and ink recovery ports 312 (see FIG. 16A) (to be described later) are formed in the upper surface of the silicon substrate 310. The ink supply ports 311 supply ink from an ink supply channel 48 to the plurality of individual supply channels 18. The ink recovery ports 312 recover ink from the plurality of individual recovery channels 19 to an ink recovery channel 49.

The ink supply ports 311 and the ink recovery ports 312 here indicate openings for supplying and recovering ink in ink circulation in the forward direction. That is, at the time of ink circulation in the forward direction, ink is supplied from the ink supply ports 311 to the individual supply channels 18, and simultaneously, ink is recovered from the individual recovery channels 19 to the ink recovery ports 312. Also, at the time of ink circulation for flowing ink in a direction reverse to the forward direction, ink is supplied from the ink recovery ports 312 to the individual recovery channels 19, and simultaneously, ink is recovered from the individual supply channels 18 to the ink supply ports 311.

As shown in FIG. 5A, the discharge module 300 can be fixed, at its upper surface, to the lower surface of the first support member 4 by adhering. In the first support member 4, the ink supply channels 48 and the ink recovery channels 49 extending from the upper surface to the lower surface can be formed. (The openings on the lower side of) the ink supply channels 48 communicate with the ink supply ports 311 (see FIG. 16A), and similarly, the ink recovery channels 49 communicate with the ink recovery ports 312. Note that the ink supply channel 48 and the ink recovery channel 49 are provided for each ink type independently of each other.

As shown in FIG. 4, the second support member 7 including openings 7*a* for receiving the discharge modules 300 can be fixed to the upper surface of the first support member 4 by adhering. The second support member 7 holds the electric wiring member 5 to be electrically connected to the discharge modules 300. The electric wiring member 5 supplies an electrical signal for discharging ink to the discharge modules 300. Note that portions that implement electrical contention between the discharge modules 300 and the electric wiring member 5 are sealed by a predetermined sealing member and can thus be protected from corrosion by ink or external impact.

As shown in FIG. 4, the electric contact substrate 6 having an external signal input terminal configured to receive an electrical signal from the liquid discharge apparatus 50 is thermally press-fitted to an end portion 5*a* of the electric wiring member 5, and the electric wiring member 5 and the electric contact substrate 6 are electrically connected to each other. This electric connection can be done via an anisotropic conductive film (not shown).

A joint member 8 can be provided between the first support member 4 and the circulation unit 54, as shown in FIG. 5A. In the joint member 8, the supply port 88 and the recovery port 89 are formed for each ink type. The supply port 88 makes the ink supply channel 48 communicate with the channel of the circulation unit 54, and the recovery port 89 makes the ink recovery channel 49 communicate with the channel of the circulation unit 54. In FIG. 5A, the supply port 88 and the recovery port 89 corresponding to the Bk color ink are shown as a supply port 88B and a recovery port 89B, respectively. Similarly, the supply ports 88 and the recovery ports 89 corresponding to the C, M, and Y color inks are shown as a supply port 88C and a recovery port 89C, a supply port 88M and a recovery port 89M, and a supply port 88Y and a recovery port 89Y, respectively.

Here, the opening of the ink supply channel 48 on the side of the ink supply port 311 can be set such that it substantially matches the opening of the ink supply port 311, and similarly, the opening of the ink recovery channel 49 on the side of the ink recovery port 312 can be set such that it substantially matches the opening of the ink recovery port 312. Also, the opening of the ink supply channel 48 on the side of the supply port 88 can be set such that it substantially matches the opening of the supply port 88, and similarly, the opening of the ink recovery channel 49 on the side of the recovery port 89 can be set such that it substantially matches the opening of the recovery port 89. According to this configuration, the channel resistance of ink can be made small.

In the liquid discharge head 1, the ink supplied to the circulation unit 54 flows from the ink supply port 311 of the discharge module 300 into the individual supply channel 18 via the supply port 88 of the joint member 8 and the ink supply channel 48 of the first support member 4. The ink flows from the individual supply channel 18 into the pressure chamber 12, and a part of the ink is discharged from the orifice 13 in the pressure chamber 12 by driving of the discharge element 15. The other part of the ink (that is, the ink remaining without being discharged) flows from the pressure chamber 12 and flows from the ink recovery port 312 into the ink recovery channel 49 of the first support member 4 via the individual recovery channel 19. After that, the ink that flows into the ink recovery channel 49 flows into the circulation unit 54 via the recovery port 89 of the joint member 8 and is recovered. The ink is circulated in this way.

<Temperate Sensors of Liquid Discharge Head>

Figure 6:
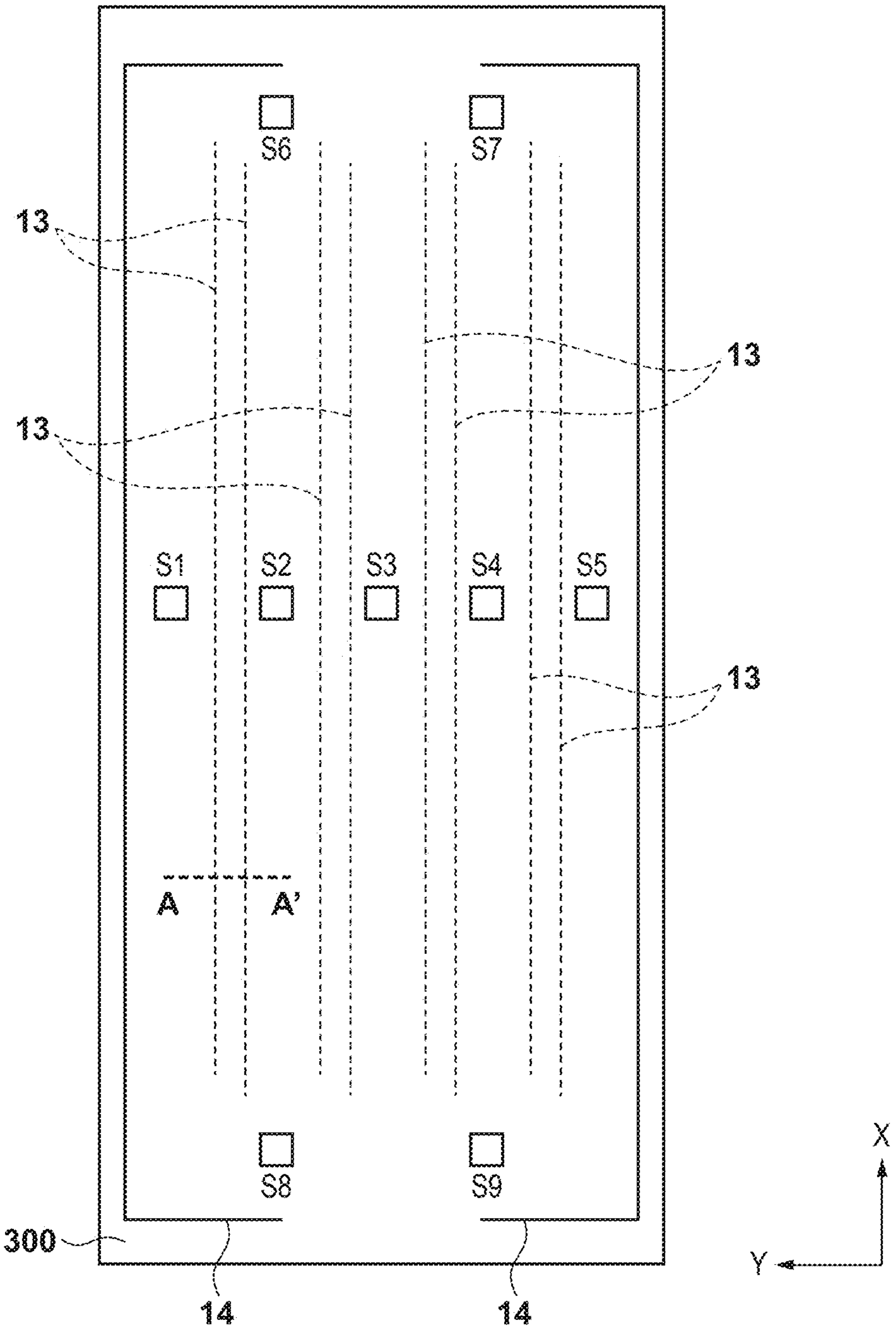
FIG. 6 is a view showing an example of the configuration of the liquid discharge head.

FIG. 6 is a plan schematic view concerning the discharge module 300 in the liquid discharge head 1. In the discharge module 300, temperate sensors S1 to S9 configured to detect an ink temperature near the orifices 13 are arranged as the head temperature sensor 37 or a part thereof. As the temperate sensors S1 to S9, diode sensors can typically be used.

Also, in the discharge module 300, sub-heaters 14 can be arranged as heating elements configured to heat the ink in the orifices 13 before execution of printing. The sub-heaters 14 can be extended along the outer edge of the discharge module 300 to surround the orifices 13 corresponding to the inks of the respective colors. The sub-heaters 14 can be driven or controlled based on the temperatures detected by the temperate sensors S1 to S9.

<Constituent Elements of Circulation Unit>

Figure 7:
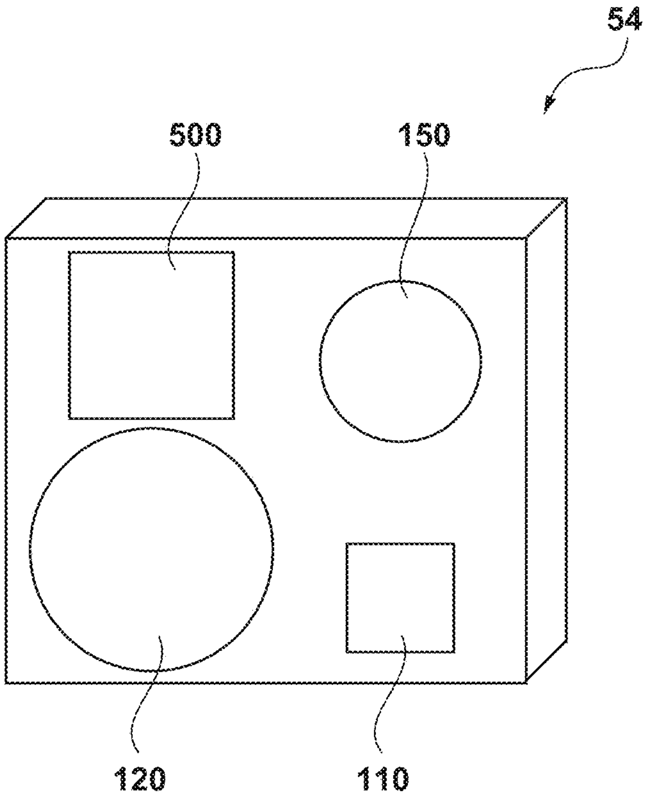
FIG. 7 is a schematic view showing the outer appearance of a circulation unit.

FIG. 7 is a schematic view showing the outer appearance of the circulation unit 54 corresponding to a certain type (color) of ink. The circulation unit 54 includes a filter 110, a first pressure adjustment unit 120, a second pressure adjustment unit 150, and the circulation pump 500. As will be described later in detail, these are connected by channels, and a circulation path configured to perform supply and recovery of ink for the discharge module 300 is formed in the liquid discharge head 1, as shown in FIGS. 8 and 9.

<Circulation Path in Liquid Discharge Head>

Figure 8:
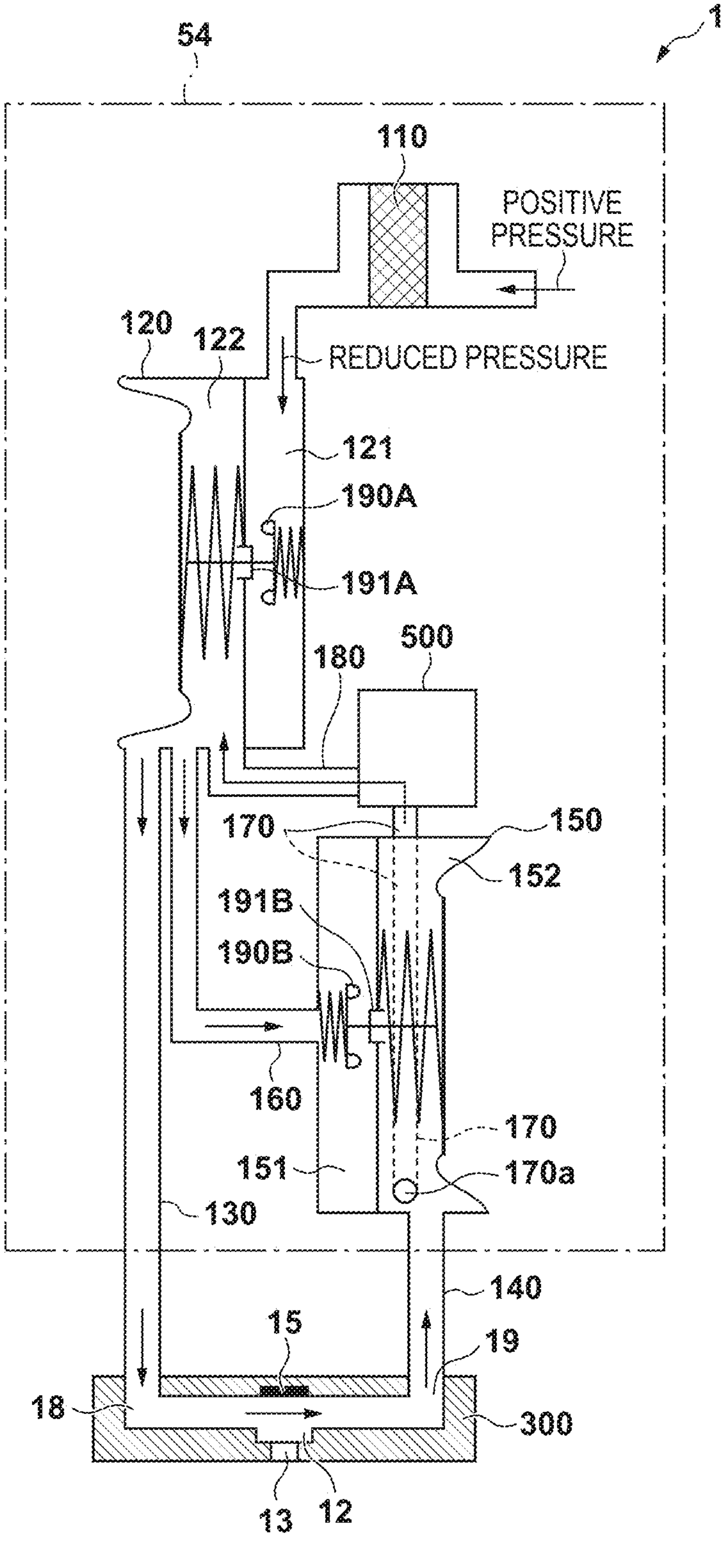
FIG. 8 is a sectional schematic view showing an example of a circulation path.

FIG. 8 is a sectional schematic view of the liquid discharge head 1 so as to show a circulation path for a certain type of ink. FIG. 9 is a block diagram showing an example of the configuration of the circulation path in FIG. 8.

Figure 9:
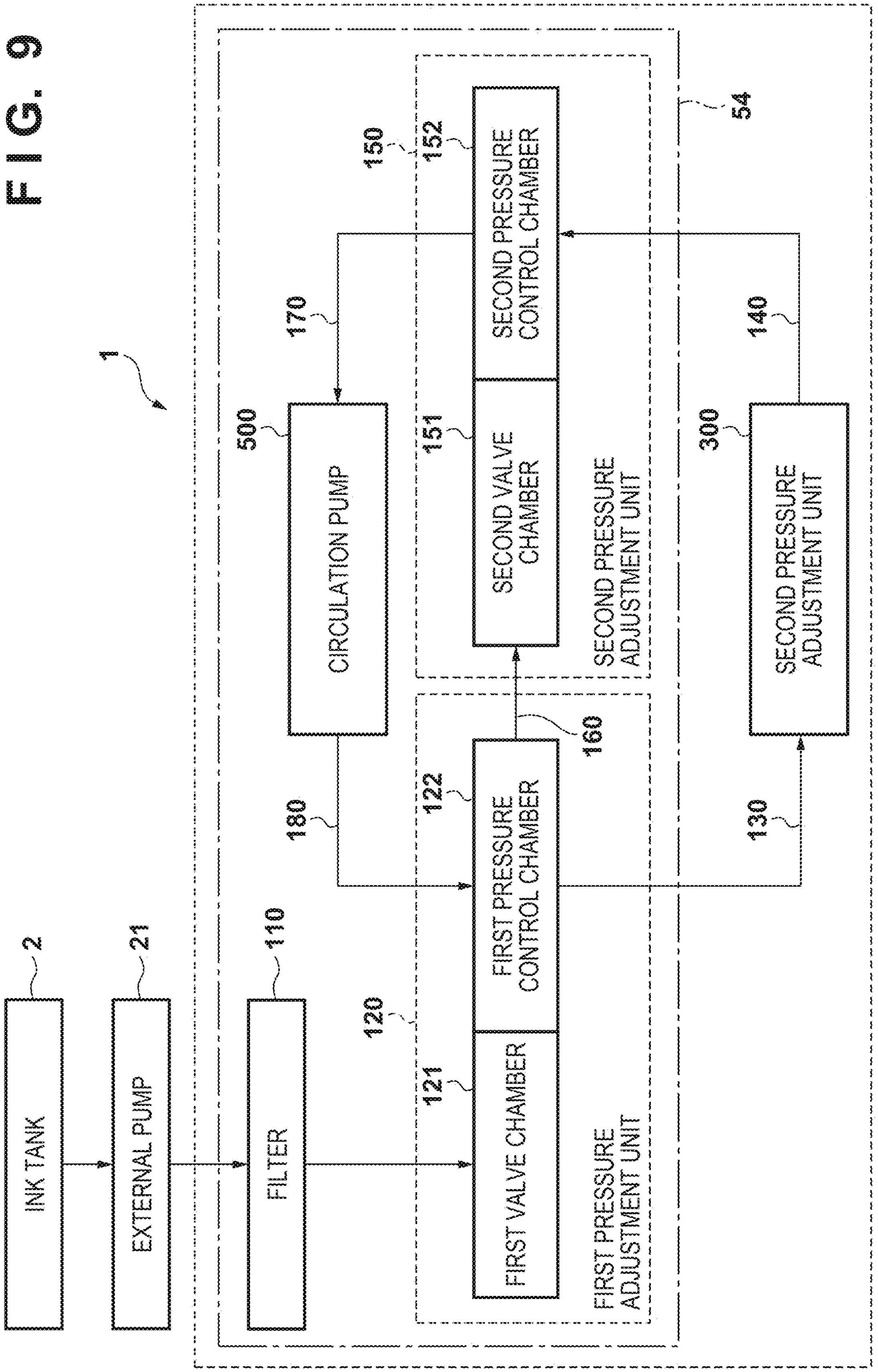
FIG. 9 is a block diagram showing the circulation path of ink.

As shown in FIGS. 8 and 9, the first pressure adjustment unit 120 includes a first valve chamber 121 and a first pressure control chamber 122, and the second pressure adjustment unit 150 includes a second valve chamber 151 and a second pressure control chamber 152. In this embodiment, ink circulation can be implemented within a predetermined pressure range using the two pressure adjustment units 120 and 150. The first pressure adjustment unit 120 is configured to have a control pressure higher than in the second pressure adjustment unit 150, and ink flows near the pressure chamber 12 (or the discharge element 15) with a flow amount according to the pressure difference therebetween.

Note that arrows in the drawings indicate the direction in which ink flows. In the following explanation, a side in the direction of ink flowing can be expressed as a downstream side, and an opposite side can be expressed as an upstream side.

As described above, the external pump 21 is connected to the ink supply tube 59 (see FIG. 1), and as shown in FIG. 9, ink is pressure-fed from the ink tank 2 to the liquid discharge head 1 and sent to the circulation unit 54. The filter 110 is provided in the ink channel on the upstream side of the circulation unit 54. The ink supply channel on the downstream side of the filter 110 is connected to the first valve chamber 121 of the first pressure adjustment unit 120.

As shown in FIG. 8, the first valve chamber 121 communicates with the first pressure control chamber 122 via a communication port 191A to be opened/closed by a valve 190A. The first pressure control chamber 122 is connected to a supply channel 130, a bypass channel 160, and a pump outlet channel 180 of the circulation pump 500. The supply channel 130 is connected to the individual supply channel 18 via the above-described ink supply port 311 provided in the discharge module 300. Also, the bypass channel 160 is connected to the second valve chamber 151 of the second pressure adjustment unit 150.

As shown in FIG. 8, the second valve chamber 151 communicates with the second pressure control chamber 152 via a communication port 191B to be opened/closed by a valve 190B. The second pressure control chamber 152 is connected to a recovery channel 140. The recovery channel 140 is connected to the individual recovery channel 19 via the above-described ink recovery port 312 provided in the discharge module 300. Also, the second pressure control chamber 152 is connected to the circulation pump 500 via a pump inlet channel 170. Note that an element 170*a* shown in FIG. 8 indicates the flow-in port of the pump inlet channel 170.

The ink that is pressurized by the external pump 21 and supplied as a positive pressure ink flow to the circulation unit 54 of the liquid discharge head 1 passes through the filter 110 to remove foreign substances, and then flows into the first valve chamber 121 of the first pressure adjustment unit 120. At this time, the pressure of the ink is reduced and changed from the positive pressure to a negative pressure. The ink with the reduced pressure is supplied to the first pressure control chamber 122 and flows into the supply channel 130 and the bypass channel 160 together with the ink that is sucked from the pump inlet channel 170 on the upstream side and pressure-fed to the pump outlet channel 180 on the downstream side by the circulation pump 500.

As will be described later in detail, in this embodiment, a piezoelectric diaphragm pump using a piezoelectric element adhered to a diaphragm as a driving source can be used as the circulation pump 500. The piezoelectric diaphragm pump changes the capacity in a pump chamber when a driving voltage is applied to the piezoelectric element, and alternately operates two check valves by pressure variation, thereby pressure-feeding a liquid.

The ink that flows into the supply channel 130 flows from the above-described ink supply port 311 of the discharge module 300 into the pressure chamber 12 via the individual supply channel 18, and a part of the ink is discharged from the orifice 13 by driving the discharge element 15. The other part of the ink (that is, the ink remaining without being discharged) flows into the recovery channel 140 via the individual recovery channel 19. The ink that flows into the recovery channel 140 flows into the second pressure control chamber 152 of the second pressure adjustment unit 150.

On the other hand, the ink that flows into the bypass channel 160 flows into the second valve chamber 151 and then flows into the second pressure control chamber 152 via the communication port 191B.

The ink that flows into the second pressure control chamber 152 is sucked into the circulation pump 500 via the pump inlet channel 170 together with the ink recovered from the recovery channel 140 by driving the circulation pump 500. The ink sucked into the circulation pump 500 is sent to the pump outlet channel 180 and flows into the first pressure control chamber 122 again.

Similarly, the ink that is supplied from the first pressure control chamber 122 to the discharge module 300 via the supply channel 130 and then flows into the second pressure control chamber 152 and the ink that flows into the second pressure control chamber 152 via the bypass channel 160 flow into the circulation pump 500. The ink is then sent from the circulation pump 500 to the first pressure control chamber 122. The ink is circulated in this way.

According to this structure, the ink can be circulated, by the circulation pump 500 provided in the liquid discharge head 1, through the circulation path formed together with the discharge module 300. When the ink is circulated, an increase of the viscosity of ink and deposition of a sedimentary component in the discharge module 300 can be suppressed, and the fluidity of ink in the discharge module 300 and the discharge characteristic at the orifice 13 can be improved. Also, ink circulation need not be executed outside the liquid discharge head 1, and using the relatively small circulation pump 500 is advantageous in reducing the size of the head 1 and the apparatus 50.

The ink is substantially flowed and circulated in one direction by the above-described pressure adjustment units 120 and 150, and the ink in the second pressure control chamber 152 flows to the first pressure control chamber 122 via the circulation pump 500. If time needed until the pressure difference between the first pressure control chamber 122 and the second pressure control chamber 152 reaches a reference is long, the circulation flow amount cannot reach a reference, and therefore, it is difficult to start printing.

When the ink in the second pressure control chamber 152 is taken by the circulation pump 500, the ink flows from the discharge module 300 as well. When a negative pressure equal to or more than the reference is applied to the nozzle, bubbles are taken into the orifice 13. For this reason, if the negative pressure in the second pressure control chamber 152 is equal to or more than the reference, a valve is opened as in the first pressure control chamber 122, and the ink is flowed not from the discharge module 300 but from the first pressure control chamber 122 into the second pressure control chamber 152 via the communication port 191B. If the ink is flowed into the second pressure control chamber 152, the pressure difference is eliminated, and the communication port 191B is closed.

If bubbles enter the circulation path from the nozzles at the time of printing, or bubbles generated, in the circulation path, from a gas contained in the ink reach the nozzles, it may be impossible to appropriately discharge the ink. Hence, chambers having a relatively large capacity corresponding to the individual supply channels 18 and the individual recovery channels 19 may be formed as bubble storage chambers between the discharge module 300 and the circulation unit 54. Note that the ink may be non-degassed ink or degassed ink.

<Pressure Adjustment Unit>

Figures 10A, 10B, 10C:
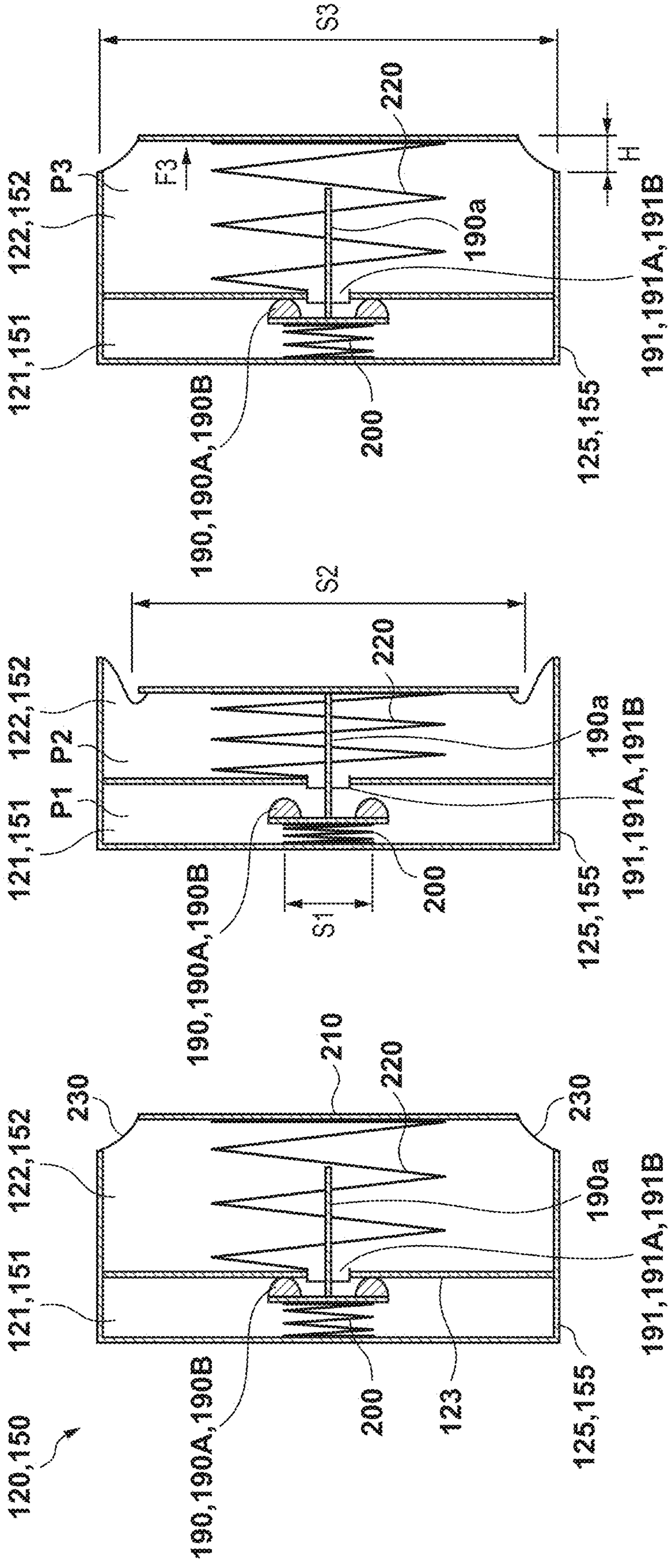
FIGS. 10A to 10C are schematic views showing an example of a pressure adjustment unit.

FIGS. 10A to 10C are schematic views showing an example of the configuration of the pressure adjustment unit 120. Note that the pressure adjustment unit 150 is configured like the pressure adjustment unit 120, and corresponding reference numerals are shown together in FIGS. 10A to 10C. For example, in a case of the second pressure adjustment unit 150, the first valve chamber 121 can be replaced with the second valve chamber 151, and the first pressure control chamber 122 can be replaced with the second pressure control chamber 152.

The first valve chamber 121 and the first pressure control chamber 122 are formed in a cylindrical housing 125 of the first pressure adjustment unit 120. The first valve chamber 121 and the first pressure control chamber 122 are divided and partitioned by a partition 123 and communicate via a communication port 191 formed in the partition 123. The first valve chamber 121 is provided with a valve 190 that switches between communication of the first valve chamber 121 and the first pressure control chamber 122 and block of the communication. The valve 190 is held, by a valve spring 200, at a position facing the communication port 191. The valve 190 can come close to and contact the partition 123 by the biasing force of the valve spring 200, and blocks the ink flow in the communication port 191 when contacting the partition 123. Note that to allow the valve 190 and the partition 123 to appropriately contact, a portion of the valve 190 that comes into contact with the partition 123 can be formed by an elastic member.

Also, a valve shaft 190*a* inserted into the communication port 191 projects from the center portion of the valve 190. When the valve shaft 190*a* is pressed against the biasing force of the valve spring 200, the valve 190 separates from the partition 123, enabling ink flow in the communication port 191.

In the following description, a state in which the ink flow in the communication port 191 is blocked is sometimes expressed as a "closed state", and a state in which the flow is possible is sometimes expressed as an "open state". FIG. 10A shows the closed state, FIG. 10B shows the open state, and FIG. 10C shows another explanation in the closed state.

The opening portion of the cylindrical housing 125 is closed by a pressure plate 210 and a flexible member 230. That is, the first pressure control chamber 122 is formed by the pressure plate 210, the flexible member 230, and a peripheral wall between the partition 123 and the housing 125. The pressure plate 210 can be displaced by the flexible member 230. Although the constituent materials of the pressure plate 210 and the flexible member 230 are not limited to this example, the pressure plate 210 is formed by a resin molded component, and the flexible member 230 is formed by a resin film. In this case, these can be fixed by heat welding.

A pressure adjustment spring 220 is provided between the pressure plate 210 and the partition 123. The pressure plate 210 and the flexible member 230 are biased by the biasing force of the pressure adjustment spring 220 to expand the internal capacity of the first pressure control chamber 122.

If the pressure in the first pressure control chamber 122 decreases, the pressure plate 210 and the flexible member 230 are displaced in a direction opposite to the biasing force of the pressure adjustment spring 220, that is, displaced in a direction of decreasing the internal capacity of the first pressure control chamber 122. If the internal capacity of the first pressure control chamber 122 decreases to a reference, the pressure plate 210 contacts the valve shaft 190*a* of the valve 190. After that, if the internal capacity of the first pressure control chamber 122 further decreases, the valve 190 moves in a direction opposite to the biasing force of the valve spring 200 and separates from the partition 123 together with the valve shaft 190*a*, and the communication port 191 is thus set in the open state (see FIG. 10B).

In this embodiment, when the communication port 191 is in the open state, the pressure in the first valve chamber 121 is higher than the pressure in the first pressure control chamber 122, and the ink flows from the first valve chamber 121 into the first pressure control chamber 122 in accordance with the open state of the communication port 191. Accordingly, the flexible member 230 and the pressure plate 210 are displaced in a direction of increasing the internal capacity of the first pressure control chamber 122. As a result, the pressure plate 210 separates from the valve shaft 190*a* of the valve 190, the communication port 191 contacts the partition 123 by the biasing force of the valve spring 200, and the communication port 191 is set in the closed state (see FIG. 10A to 10C).

In the first pressure adjustment unit 120, if the pressure in the first pressure control chamber 122 decreases to the reference or less (for example, if a relatively large negative pressure is applied), the ink flows from the first valve chamber 121 via the communication port 191. The first pressure adjustment unit 120 is configured to prevent the pressure in the first pressure control chamber 122 from further decreasing. Hence, control is performed such that a pressure within a reference range is obtained in the first pressure control chamber 122.

Here, consider a state in which, as described above, the flexible member 230 and the pressure plate 210 are displaced in accordance with the pressure in the first pressure control chamber 122, the pressure plate 210 contacts the valve shaft 190*a*, and the communication port 191 is set in the open state (the state shown in FIG. 10B). At this time, the relationship of forces acting on the pressure plate 210 can be expressed as $$P2 \times S2 + F2 + (P1 - P2) \times S1 + F1 = 0 \tag{1}$$

P1: the pressure (gauge pressure) in the first valve chamber 121

P2: the pressure (gauge pressure) in the first pressure control chamber 122

F1: the spring force of the valve spring 200

F2: the spring force of the pressure adjustment spring 220

S1: the pressure receiving area of the valve 190

S2: the pressure receiving area of the pressure plate 210

Furthermore, if equation (1) is written concerning P2, we obtain $$P2 = -(F1 + F2 + P1 \times S1)/(S2 - S1) \tag{2}$$

Here, for the spring force F1 of the valve spring 200 and the spring force F2 of the pressure adjustment spring 220, a direction of pressing the valve 190 and the pressure plate 210 is defined as positive (the rightward direction in FIG. 10B). Also, the pressure P1 in the first valve chamber 121 and the pressure P2 in the first pressure control chamber 122 are set such that P1≥P2 holds.

The pressure P2 in the first pressure control chamber 122 when the communication port 191 is in the open state is decided by equation (2). When the communication port 191 is set in the open state, the ink flows from the first valve chamber 121 into the first pressure control chamber 122 because P1≥P2. As a result, the pressure P2 in the first pressure control chamber 122 does not further decrease, and the pressure P2 is maintained in the reference range.

On the other hand, as shown in FIG. 10C, when the pressure plate 210 is in a noncontact state with respect to the valve shaft 190*a*, and the communication port 191 is in the closed state, the relationship of forces acting on the pressure plate 210 can be expressed as $$P3 \times S3 + F3 = 0 \tag{3}$$

F3: the spring force of the pressure adjustment spring 220 when the communication port 191 is in the closed state P3: the pressure (gauge pressure) in the first pressure control chamber 122 when the communication port 191 is in the closed state S3: the pressure receiving area of the pressure plate 210 when the communication port 191 is in the closed state Based on equation (3), the pressure P3 can be represented by $$P3 = -F3/S3 \tag{4}$$

Here, FIG. 10C shows a state in which the pressure plate 210 and the flexible member 230 are displaced up to the position of displacement limit (the position at which the displacement amount in the rightward direction in FIG. 10C is maximum). The pressure P3 in the first pressure control chamber 122, the spring force F3 of the pressure adjustment spring 220, and the pressure receiving area S3 of the pressure plate 210 change in accordance with the displacement amount during the displacement of the pressure plate 210 and the flexible member 230 to the state shown in FIG. 10C. More specifically, if the pressure plate 210 and the flexible member 230 are located on the left side of the state shown in FIG. 10C, the pressure receiving area S3 of the pressure plate 210 becomes small, and the spring force F3 of the pressure adjustment spring 220 becomes large. As a result, the pressure P3 in the first pressure control chamber 122 is smaller than that of equation (4). Hence, by equations (2) and (4), during the time until the state shown in FIG. 10B (the open state of the communication port 191) changes to the state shown in FIG. 10C (the closed state of the communication port 191), the pressure in the first pressure control chamber 122 gradually rises, and the negative pressure weakens and approaches the positive pressure side.

<Circulation Pump>

Figure 11A:
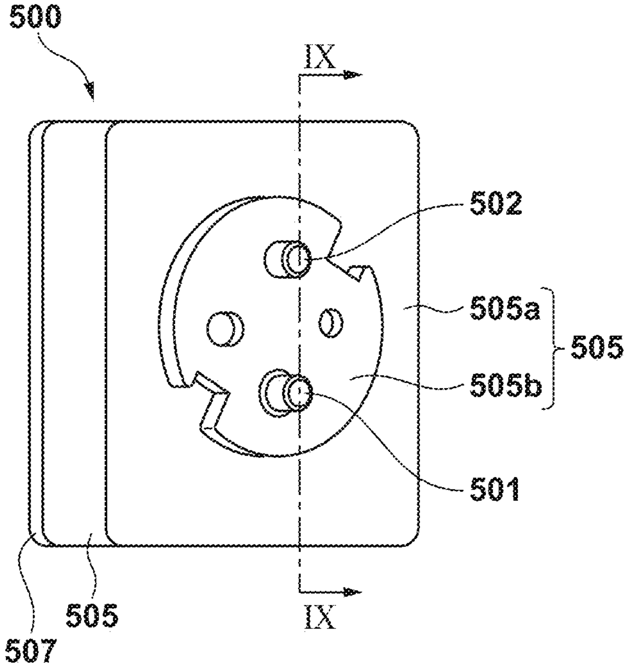
FIGS. 11A and 11B are perspective views showing the outer appearance of a circulation pump.
Figure 11B:
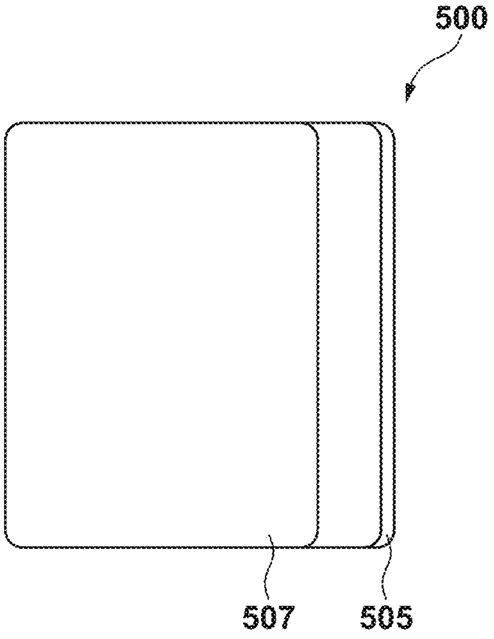
Figure 12:
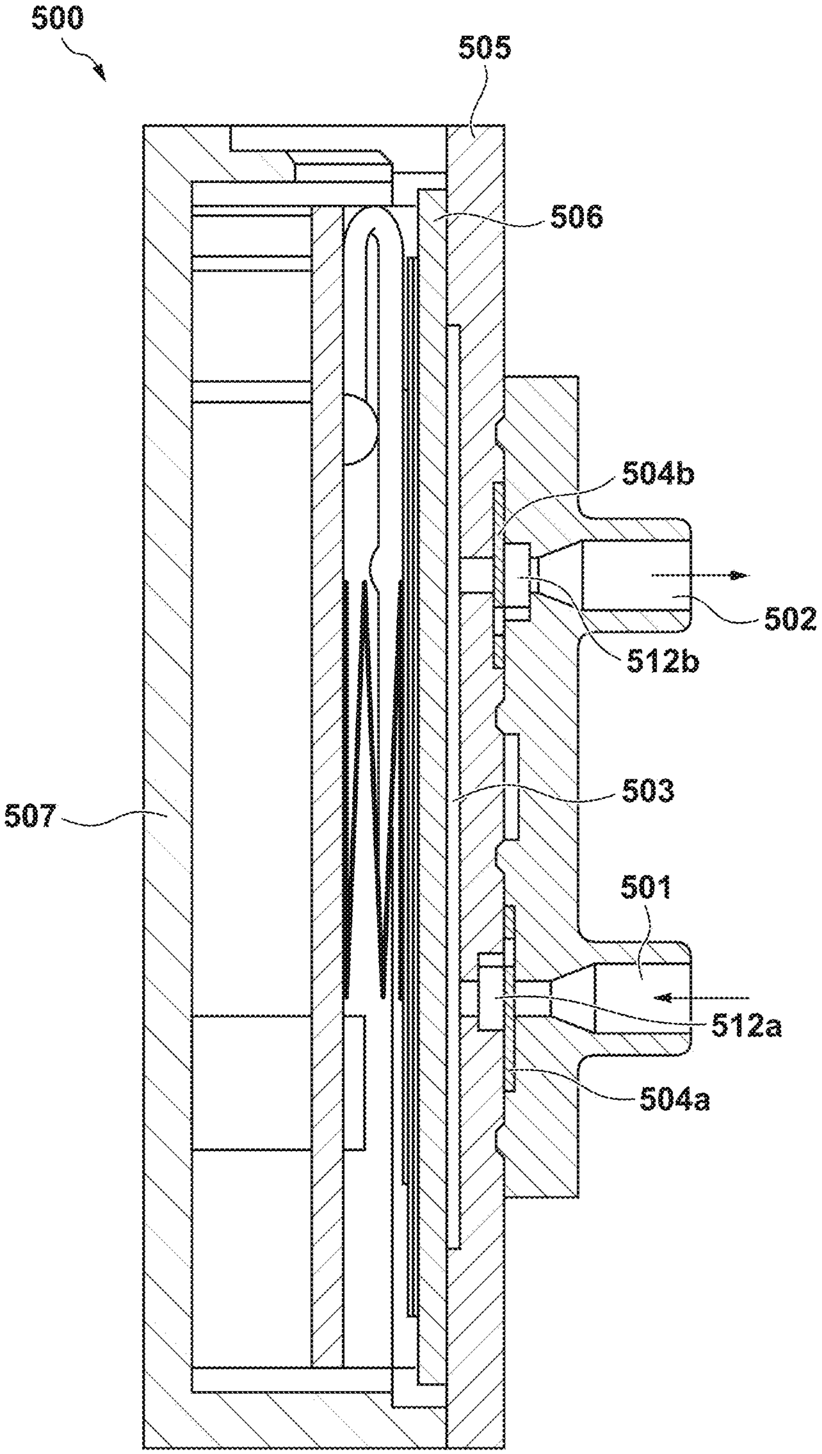
FIG. 12 is a sectional schematic view of the circulation pump.

FIG. 11A is a perspective view showing the outer appearance of the circulation pump 500 on the front side. FIG. 11B is a perspective view showing the outer appearance of the circulation pump 500 on the rear side. FIG. 12 is a sectional schematic view of the circulation pump 500 taken along a line IX-IX in FIG. 11A. The exterior of the circulation pump 500 can be formed by a pump housing 505, and a cover 507 fixed to the pump housing 505.

The pump housing 505 can be formed by a housing portion main body 505*a*, and a channel connecting member 505*b* fixed to the outer surface thereof by adhering. In each of the housing portion main body 505*a* and the channel connecting member 505*b*, a pair of through holes configured to make these communicate with each other are provided at two positions different from each other. One through hole forms a pump supply hole 501, and the other through hole forms a pump discharge hole 502. The pump supply hole 501 is connected to the pump inlet channel 170 connected to the second pressure control chamber 152. The pump discharge hole 502 is connected to the pump outlet channel 180 connected to the first pressure control chamber 122. Ink supplied from the pump supply hole 501 is discharged from the pump discharge hole 502 via a pump chamber 503, as shown in FIG. 12.

A diaphragm 506 is jointed to the inner wall of the pump housing 505, and the pump chamber 503 is formed between a concave portion formed in the inner wall of the pump housing 505 and the diaphragm 506. The pump chamber 503 communicates with the pump supply hole 501 and the pump discharge hole 502. Also, a check valve 504*a* is provided in the intermediate portion of the pump supply hole 501, and a check valve 504*b* is provided at the intermediate portion of the pump discharge hole 502. The check valve 504*a* is arranged such that a part of the check valve 504*a* can move to the left side in FIG. 12 in a space 512*a* formed in the intermediate portion of the pump supply hole 501. The check valve 504*b* is arranged such that a part of the check valve 504*b* can move to the right side in FIG. 12 in a space 512*b* formed in the intermediate portion of the pump discharge hole 502.

If the diaphragm 506 is displaced to increase the capacity of the pump chamber 503, and the pressure in the pump chamber 503 is thus reduced, the check valve 504*a* separates from the opening of the pump supply hole 501 in the space 512*a* (moves to the left side in FIG. 12). When the valve 504*a* separates from the opening of the pump supply hole 501, an open state in which ink flow in the pump supply hole 501 is possible is obtained. If the diaphragm 506 is displaced to decrease the capacity of the pump chamber 503, and the pressure in the pump chamber 503 is thus raised, the check valve 504*a* contacts the wall surface around the opening of the pump supply hole 501, and a closed state in in which ink flow in the pump supply hole 501 is blocked is obtained.

On the other hand, if the pressure in the pump chamber 503 is reduced, the check valve 504*b* contacts the wall surface around the opening of the pump housing 505, and a closed state in in which ink flow in the pump discharge hole 502 is blocked is obtained. If the pressure in the pump chamber 503 is raised, the check valve 504*b* separates from the opening of the pump housing 505 and moves to the side of the space 512*b* (the right side in FIG. 12), thereby enabling ink flow in the pump discharge hole 502.

Note that the check valves 504*a* and 504*b* need only be made of a material that can be deformed in accordance with the pressure in the pump chamber 503, and can be formed by, for example, an elastic member such as EPDM or elastomer, a film such as a polypropylene film, or a thin plate. However, the material is not limited to these.

As described above, the pump chamber 503 is formed by joining the pump housing 505 and the diaphragm 506. Hence, when the diaphragm 506 is deformed, the pressure in the pump chamber 503 changes.

For example, if the diaphragm 506 is displaced to the side of the pump housing 505 (the right side in FIG. 12), and the capacity of the pump chamber 503 is decreased, the pressure in the pump chamber 503 rises. Accordingly, the check valve 504*b* arranged facing the pump discharge hole 502 is set in the open state, and the ink in the pump chamber 503 is discharged. At this time, the check valve 504*a* arranged facing the pump supply hole 501 contacts the wall surface around the pump supply hole 501, and backflow of the ink from the pump chamber 503 to the pump supply hole 501 is suppressed.

If the diaphragm 506 is displaced in a direction of expanding the pump chamber 503, the pressure in the pump chamber 503 decreases. Accordingly, the check valve 504*a* arranged facing the pump supply hole 501 is set in the open state, and the ink is supplied to the pump chamber 503. At this time, the check valve 504*b* arranged in the pump discharge hole 502 contacts the wall surface around the opening formed in the pump housing 505 to close the opening. Hence, backflow of the ink from the pump discharge hole 502 to the pump chamber 503 is suppressed.

As described above, in the circulation pump 500, the diaphragm 506 is deformed to change the pressure in the pump chamber 503, thereby sucking and discharging the ink. At this time, in a case where bubbles are mixed into the pump chamber 503, even if the diaphragm 506 is displaced, the pressure change in the pump chamber 503 is small because of expansion/contraction of the bubbles, and therefore, the liquid feed amount decreases. To prevent this, the pump chamber 503 is arranged to extend in the vertical direction such that bubbles mixed into the pump chamber 503 easily gather to the upper portion of the pump chamber 503, and the pump discharge hole 502 is arranged above the center of the pump chamber 503. This makes it possible to appropriately discharge bubbles in the pump chamber 503 and stabilize the flow amount.

Figure 13A:
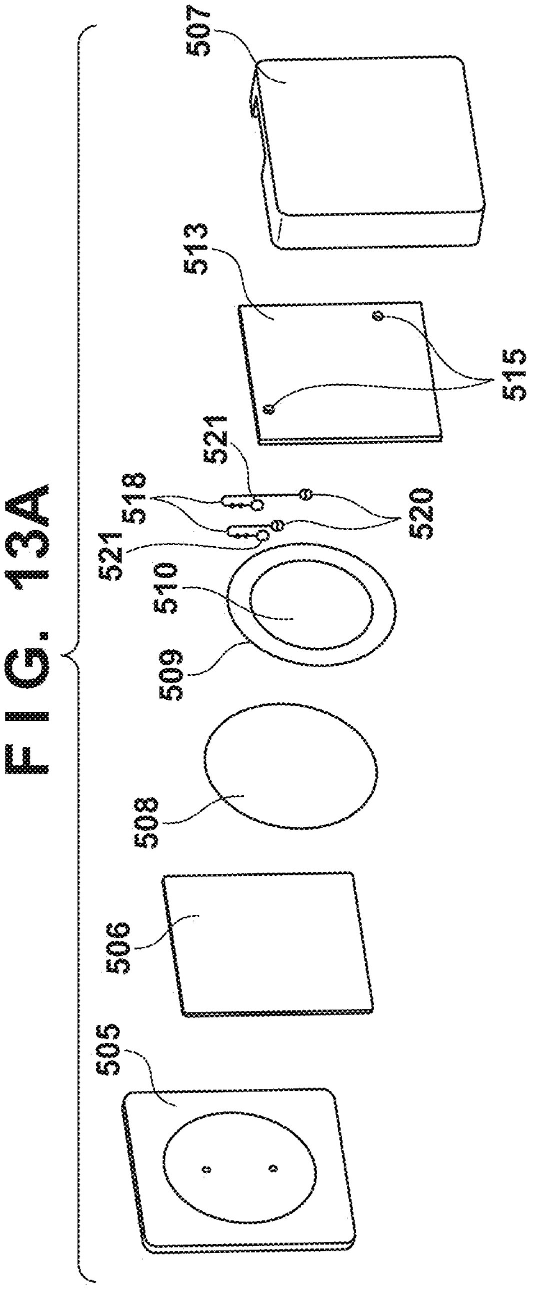
FIGS. 13A and 13B are exploded perspective views of the circulation pump.
Figure 13B:
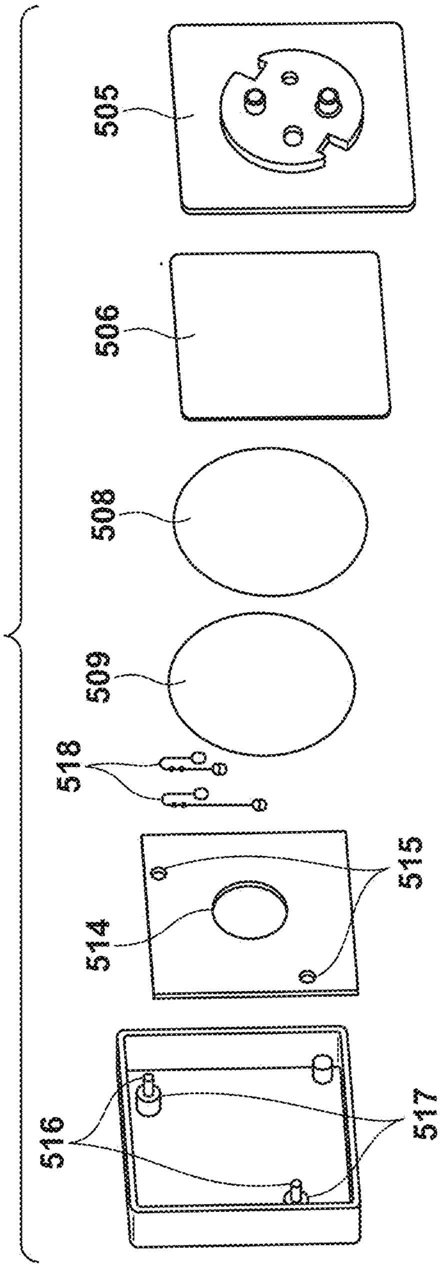

FIGS. 13A and 13B are exploded perspective views of the circulation pump 500. FIG. 13A shows the circulation pump 500 viewed from one side, and FIG. 13B shows it viewed from the other side.

Figure 14:
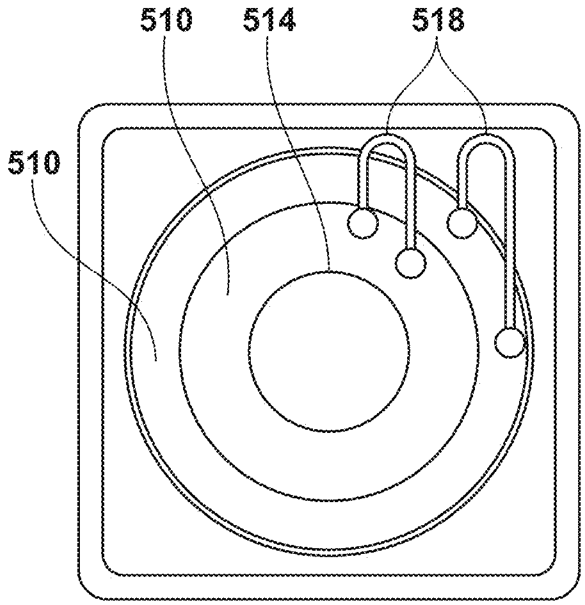
FIG. 14 is a perspective view of the circulation pump.

FIG. 14 is a perspective view showing the positional relationship between elements provided in the circulation pump 500.

The circulation pump 500 includes not only the pump housing 505, the diaphragm 506, and the cover 507 but also a vibration plate 509, a drive circuit board 513, and electric connection cables 518. A piezoelectric ceramic 510 is fixed to the vibration plate 509 by adhering, and the vibration plate 509 is fixed to the diaphragm 506 via an adhesive 508. For the diaphragm 506, an injection moldable material such as modified PPE (polyphenylene ether)+PS (polystyrene) or polypropylene can be used. However, a member formed by punching a film or a resin plate may be used, and the material is not limited to this example. For the vibration plate 509, brass, stainless, an iron-nickel alloy, or the like can be used, and the material is not limited to this example.

The drive circuit board 513 is electrically connected, by a cable or the like, or an electric connection terminal that is an electric connection terminal of the electric contact substrate 6 and is configured to drive the circulation pump 500. Also, the drive circuit board 513 is arranged facing the piezoelectric ceramic 510, and electrically connected to the piezoelectric ceramic 510 and the vibration plate 509 via the electric connection cables 518. The drive circuit board 513 applies a voltage to the piezoelectric ceramic 510 and the vibration plate 509 based on power received from the main body of the liquid discharge apparatus 50, thereby driving the circulation pump 500.

The electric connection cables 518 and the drive circuit board 513 can be fixed and electrically connected by solder 521, and the electric connection cables 518, the piezoelectric ceramic 510, and the vibration plate 509 can be fixed and electrically connected by solder 520.

Here, the vibration plate 509 is connected to the ground line (GND wire) of the drive circuit board 513 via the electric connection cable 518, and the piezoelectric ceramic 510 is connected to the AC voltage output portion of the drive circuit board 513 via the electric connection cable 518. That is, when an AC voltage is applied to the piezoelectric ceramic 510 in a state in which the vibration plate 509 is grounded, the piezoelectric ceramic 510 expanded and contracted, and the diaphragm 506 is thus deformed. In this way, the above-described ink suction/discharge by the circulation pump 500 is implemented.

<Flow of Ink in Liquid Discharge Head>

FIGS. 15A to 15E are schematic views for explaining the flow of ink in the liquid discharge head 1.

Figures 15A, 15B, 15C, 15D, 15E:
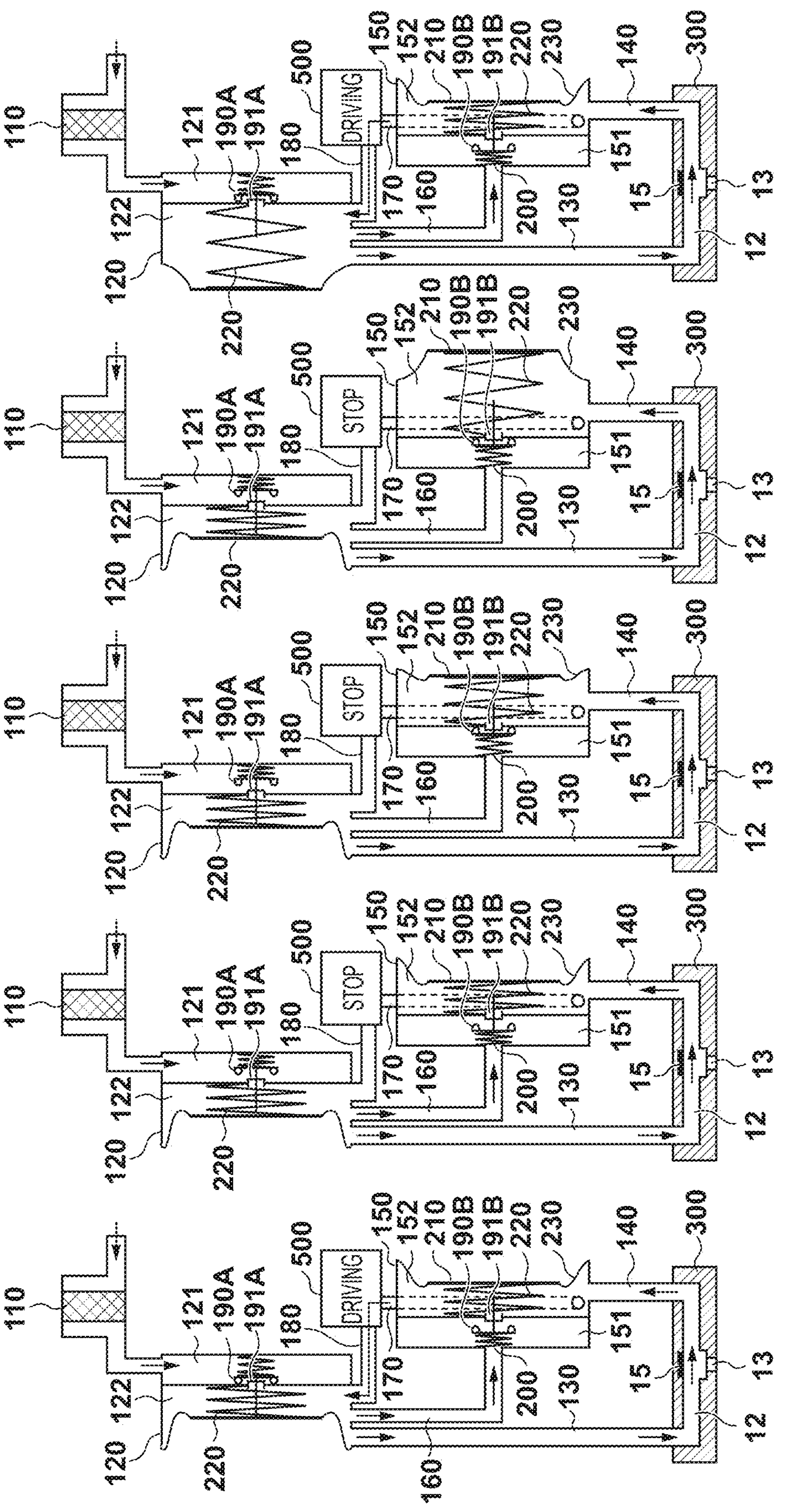
FIGS. 15A to 15E are schematic views for explaining the flow of ink in the liquid discharge head.

FIG. 15A shows the flow of ink during execution of the printing operation. Arrows in FIGS. 15A to 15E indicate the flow of ink. When executing the printing operation, both the external pump 21 and the circulation pump 500 start being driven. Note that the external pump 21 and the circulation pump 500 may be driven independently of the printing operation, and these may be driven not cooperatively but separately/independently.

During execution of the printing operation, the circulation pump 500 is in a driving state, and the ink flowed out from the first pressure control chamber 122 flows into the supply channel 130 and the bypass channel 160. The ink that flows into the supply channel 130 passes through the discharge module 300. After that, the ink flows into the recovery channel 140 and is then supplied to the second pressure control chamber 152.

On the other hand, the ink that flows from the first pressure control chamber 122 into the bypass channel 160 flows into the second pressure control chamber 152 via the second valve chamber 151. The ink that flows into the second pressure control chamber 152 passes through the pump inlet channel 170, the circulation pump 500, and the pump outlet channel 180 and then flows into the first pressure control chamber 122 again. Here, the control pressure by the first valve chamber 121 is set to be higher than the control pressure of the first pressure control chamber 122 in accordance with equation (2). Hence, the ink in the first pressure control chamber 122 is supplied to the discharge module 300 via the supply channel 130 again without flowing to the first valve chamber 121. The ink that flows into the discharge module 300 flows into the first pressure control chamber 122 again via the recovery channel 140, the second pressure control chamber 152, the pump inlet channel 170, the circulation pump 500, and the pump outlet channel 180.

Ink circulation is thus completed in the liquid discharge head 1.

In the ink circulation, the flow amount or circulation amount of the ink in the discharge module 300 is decided by the pressure difference (the difference of the control pressure) between the first pressure control chamber 122 and the second pressure control chamber 152. The pressure difference is set to obtain a flow amount capable of suppressing an increase of the viscosity of ink near the orifice 13 in the discharge module 300.

Also, ink as much as the amount consumed by printing is supplied from the ink tank 2 to the first pressure control chamber 122 via the filter 110 and the first valve chamber 121. When the ink in the circulation path is consumed by printing, the ink in the first pressure control chamber 122 decreases, and the internal capacity of the first pressure control chamber 122 decreases along with this. Accordingly, the communication port 191A is set in the open state, and the ink is supplied from the first valve chamber 121 to the first pressure control chamber 122. A pressure loss occurs in the supplied ink during passage from the first valve chamber 121 to the communication port 191A, and the ink in a positive pressure state changes to a negative pressure state when flowing into the first pressure control chamber 122. When the ink flows from the first valve chamber 121 into the first pressure control chamber 122, the internal capacity of the first pressure control chamber increases, and the communication port 191A is set in the closed state.

In accordance with consumption of the ink, the communication port 191A repeats the open state and the closed state. If the ink is not consumed, the communication port 191A maintains the closed state.

FIG. 15B shows the flow of ink after the printing operation is ended, and the circulation pump 500 is set in a stop state. At the point of time when the circulation pump 500 is set in the stop state, both the pressure in the first pressure control chamber 122 and that in the second pressure control chamber 152 remain the control pressures during the printing operation. For this reason, movement of ink occurs, as shown in FIG. 15B, in accordance with the pressure difference between the first pressure control chamber 122 and the second pressure control chamber 152. That is, the flow of ink is continued such that the ink is supplied from the first pressure control chamber 122 to the discharge module 300 via the supply channel 130 and then flows to the second pressure control chamber 152 via the recovery channel 140. The flow of ink from the first pressure control chamber 122 to the second pressure control chamber 152 via the bypass channel 160 and the second valve chamber 151 is also continued.

In this way, ink as much as the amount of ink moved from the first pressure control chamber 122 to the second pressure control chamber 152 is supplied from the ink tank 2 to the first pressure control chamber 122 via the filter 110 and the first valve chamber 121. For this reason, the internal capacity of the first pressure control chamber 122 is maintained. If the internal capacity of the first pressure control chamber 122 is constant, the spring force F1 of the valve spring 200, the spring force F2 of the pressure adjustment spring 220, the pressure receiving area S1 of the valve 190, and the pressure receiving area S2 of the pressure plate 210 are kept constant in accordance with equation (2). Since the pressure P2 in the first pressure control chamber 122 is decided in accordance with the change of the pressure (gauge pressure) P1 in the first valve chamber 121, if the pressure P1 does not change, the pressure P2 is kept the same as the control pressure during the printing operation.

On the other hand, the pressure in the second pressure control chamber 152 changes over time in accordance with the change of the internal capacity along with the flow-in of the ink from the first pressure control chamber 122. That is, during the time until the state shown in FIG. 15B changes to a state (a state shown in FIG. 15C) in which the communication port 191 is set in the closed state, and the second valve chamber 151 and the second pressure control chamber 152 are set in a noncommunicating state, the pressure in the second pressure control chamber 152 changes in accordance with equation (2). After that, the pressure plate 210 and the valve shaft 190*a* are set in a noncontact state, and the communication port 191 changes to the closed state. Then, as shown in FIG. 15D, the ink flows from the recovery channel 140 into the second pressure control chamber 152. Accordingly, the pressure plate 210 and the flexible member 230 are displaced, and the pressure in the second pressure control chamber 152 changes and rises in accordance with equation (4) until the internal capacity of the second pressure control chamber 152 is maximized.

If the state shown in FIG. 15C is obtained, the flow of ink from the first pressure control chamber 122 to the second pressure control chamber 152 via the bypass channel 160 and the second valve chamber 151 does not occur. Hence, after the ink in the first pressure control chamber 122 is supplied to the discharge module 300 via the supply channel 130, only the flow to the second pressure control chamber 152 via the recovery channel 140 may substantially occur. As described above, the movement of ink from the first pressure control chamber 122 to the second pressure control chamber 152 occurs due to the pressure difference between the first pressure control chamber 122 and the second pressure control chamber 152. For this reason, if the pressure in the second pressure control chamber 152 equals the pressure in the first pressure control chamber 122, the movement of ink stops.

In a state in which the pressure in the second pressure control chamber 152 equals the pressure in the first pressure control chamber 122, the second pressure control chamber 152 expands up to the state shown in FIG. 15D. If the second pressure control chamber 152 expands, a storage portion capable of storing ink is formed in the second pressure control chamber 152. Note that the time from the stop of the circulation pump 500 until transition to the state shown in FIG. 15D is about 1 to 2 min although it can change depending on the shape and size of each channel and the characteristic of the ink.

If the circulation pump 500 is driven from the state shown in FIG. 15D in which the storage portion is formed in the second pressure control chamber 152 to enable storage of the ink, the ink in the storage portion is supplied to the first pressure control chamber 122 by the circulation pump 500. Thus, as shown in FIG. 15E, the ink amount in the first pressure control chamber 122 increases, and the flexible member 230 and the pressure plate 210 are displaced in the expanding direction. When driving of the circulation pump 500 is continued, the state in the circulation path changes, as shown in FIG. 12A.

FIG. 15A has been exemplified above as a mode during execution of the printing operation. However, ink circulation may be performed without the printing operation, as described above. In this case as well, the ink flows, as shown in FIGS. 15A to 15E, in accordance with driving and stop of the circulation pump 500.

In this embodiment, a mode has been exemplified in which the communication port 191B of the second pressure adjustment unit 150 is set in the open state when the ink is circulated by driving the circulation pump 500, and set in the closed state when the ink circulation is stopped. However, the present invention is not limited to this. For example, the control pressure may be set such that even if the ink is circulated by driving the circulation pump 500, the communication port 191B of the second pressure adjustment unit 150 is set in the closed state.

The bypass channel 160 that connects the pressure adjustment units 120 and 150 can be provided such that, for example, if a negative pressure generated in the circulation path is higher than usual/higher than a reference, it is prevented from substantially affecting the discharge module 300. For example, if the characteristic (viscosity or the like) of ink changes due to a change of an environment such as a temperature, the pressure loss in the circulation path also changes. For example, if the viscosity of ink lowers, the pressure loss in the circulation path decreases, and the negative pressure in the circulation path can be higher than usual. Along with this, outside air may be drawn from the orifice 13 into the circulation path and break the meniscus of the orifice 13, and it may be impossible to appropriately perform discharge. Hence, in this embodiment, the bypass channel 160 is provided in the circulation path.

According to the bypass channel 160, if the negative pressure is higher than usual, ink flows to the bypass channel 160 as well, and the pressure in the discharge module 300 can be maintained. For example, the communication port 191 of the second pressure adjustment unit 150 can be configured to obtain a control pressure capable of maintaining the closed state even during driving of the circulation pump 500. If the negative pressure is high, the control pressure of the second pressure adjustment unit may be set such that the communication port 191 is set in the open state.

Also, since a force of drawing ink is generated in the pressure chamber due to the discharge operation by the discharge element 15, the pressure variation in the circulation path may occur in the discharge operation as well. Hence, for example, even if the communication port 191 of the second pressure adjustment unit 150 is configured to be set in the closed state during driving of the circulation pump 500, the communication port 191 may be in the open state at the time of the discharge operation. For example, if printing with a relatively high duty ratio is continued, the negative pressure in the pressure chamber may be high. Accordingly, the ink moves even from the side of the recovery channel 140 to the pressure chamber (orifice 13), that is, backflow of ink occurs (note that this backflow can occur because the bypass channel 160 is provided). Thus, the ink in the second pressure control chamber 152 decreases, and the second pressure control chamber 152 is reduced. As a result, the communication port 191 of the second pressure adjustment unit 150 may be set in the open state. In this case, the ink in the supply channel 130 and the ink in the recovery channel 140 are filled and discharged to the pressure chamber.

In the above-described explanation, a mode in which the communication port 191 of the second pressure adjustment unit 150 is set in the open state in accordance with the backflow of ink has been shown. The backflow of ink may occur in a case where the communication port 191 of the second pressure adjustment unit 150 is in the open state. Also, even in a configuration without the second pressure adjustment unit 150, the backflow of ink can occur when the bypass channel 160 is provided.

<Configuration of Discharge Unit>

Figure 16A:
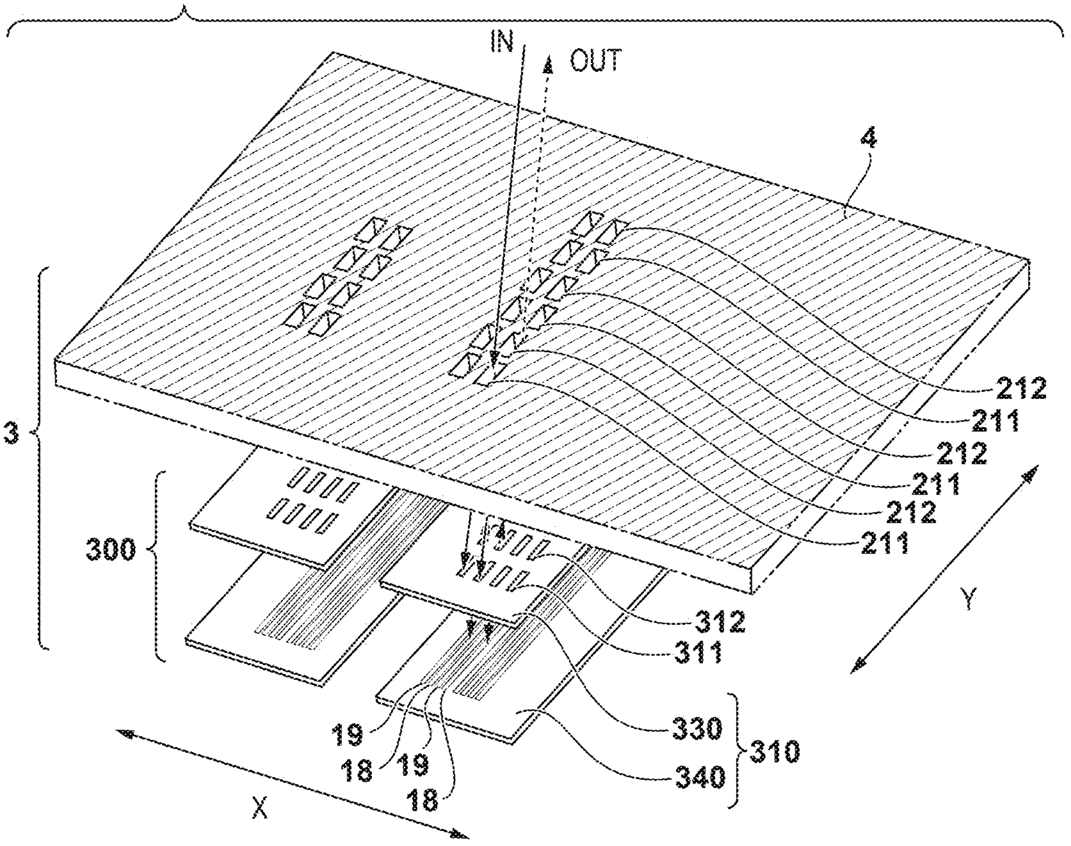
FIGS. 16A and 16B are schematic views showing the circulation path in a discharge unit.
Figure 16B:
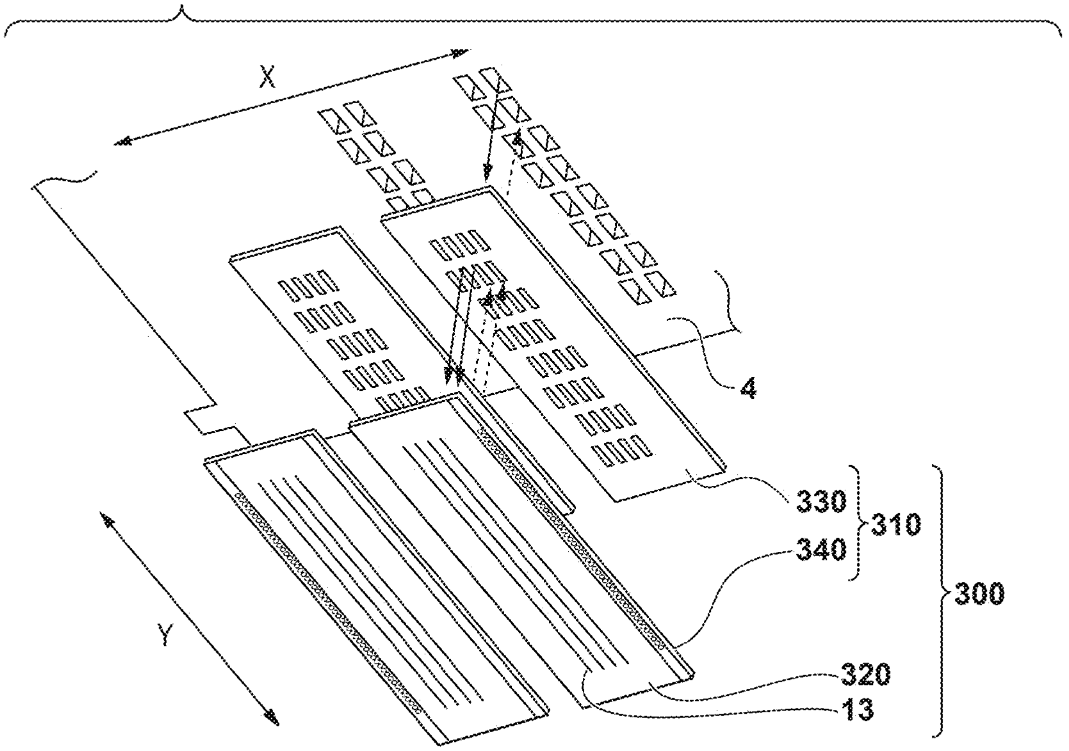

FIG. 16A is an exploded perspective view showing the discharge unit 3 viewed from the side of the first support member 4 so as to explain the circulation path for a certain type of ink, and FIG. 16B is an exploded perspective view showing the discharge unit 3 viewed from the side of the discharge module 300. Note that for the first support member 4 in FIG. 16A, a sectional structure taken along a line XI-XI in FIG. 5A is shown. Arrows shown in FIGS. 16A and 16B together with IN/OUT indicate the directions of ink flows (flow-in/flow-out), and this also applies to the other types (other colors). Here, to make the drawings easy to see, the second support member 7 and the electric wiring member 5 are omitted.

Figure 17:
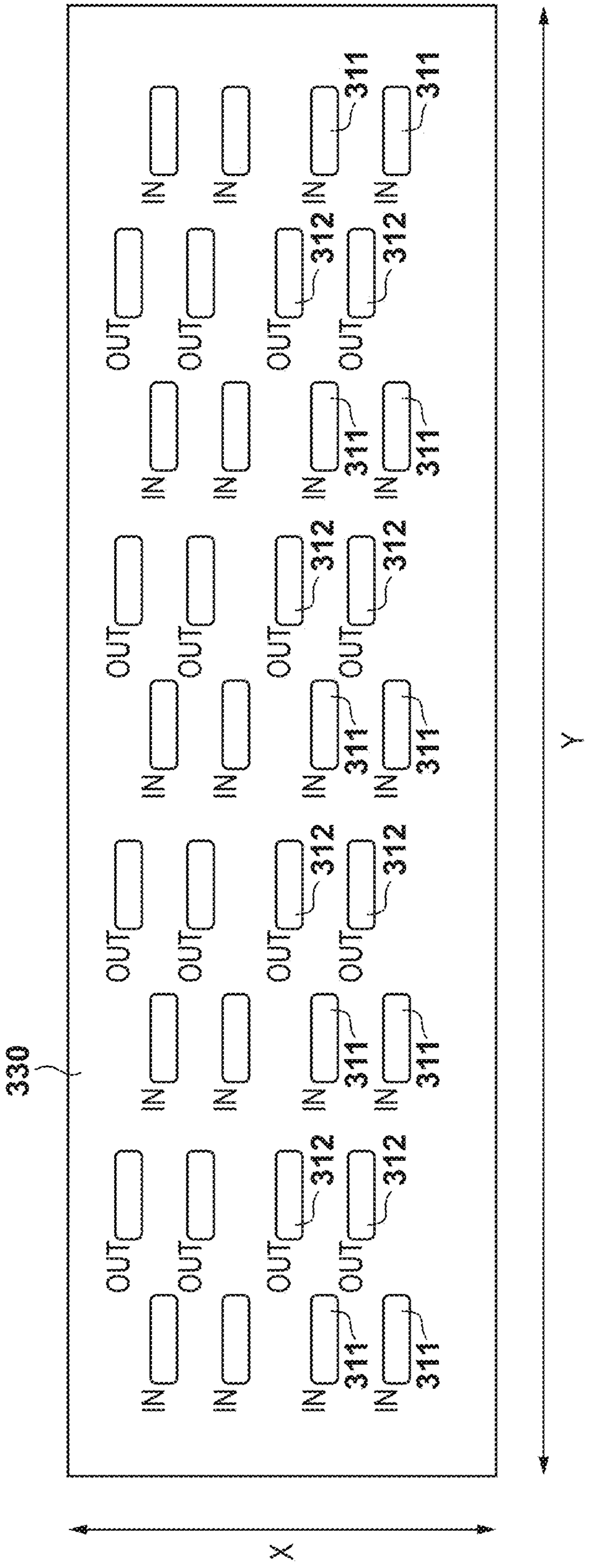
FIG. 17 is a view showing an opening plate.

The discharge module 300 includes a discharge element substrate 340 and an opening plate 330. FIG. 17 is a plan schematic view of the opening plate 330, and FIG. 18 is a plan schematic view of the discharge element substrate 340.

The discharge module 300 is formed by overlaying and joining the discharge element substrate 340 and the opening plate 330 such that the channels of inks communicate, and is supported by the first support member 4, thereby forming the discharge unit 3. The ink is supplied from the circulation units 54 to the discharge unit 3 via the joint member 8 (see FIG. 5A).

Figure 18:
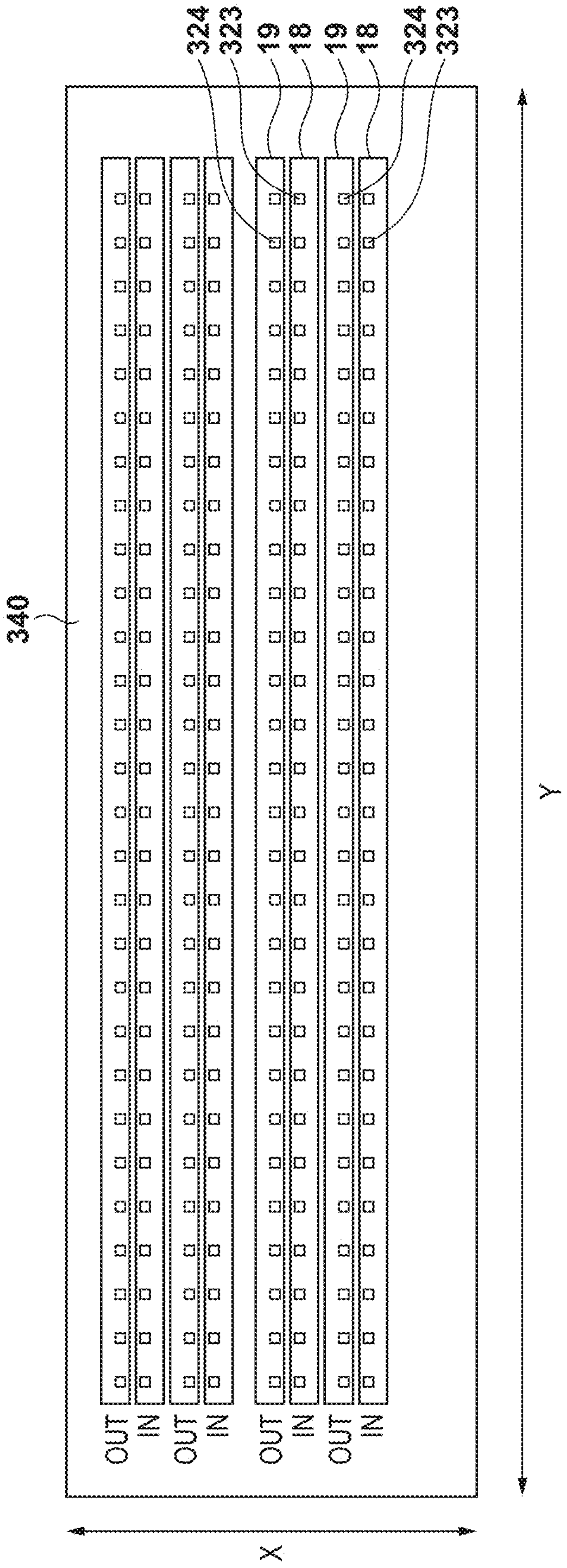
FIG. 18 is a view showing a discharge element substrate.

As shown in FIGS. 16A, 16B, and 18, the discharge element substrate 340 includes the orifice forming member 320. In the orifice forming member 320, a plurality of orifice arrays are formed by arraying the plurality of orifices 13, and a part of ink supplied via the ink channel of the discharge module 300 can be discharged from the orifices 13. Note that the other part of the ink that is not discharged is recovered via the ink channel of the discharge module 300, as described above. In the opening plate 330, as shown in FIGS. 16A, 16B, and 17, the plurality of ink supply ports 311 are arrayed, and the plurality of ink recovery ports 312 are arrayed.

Figure 19A:
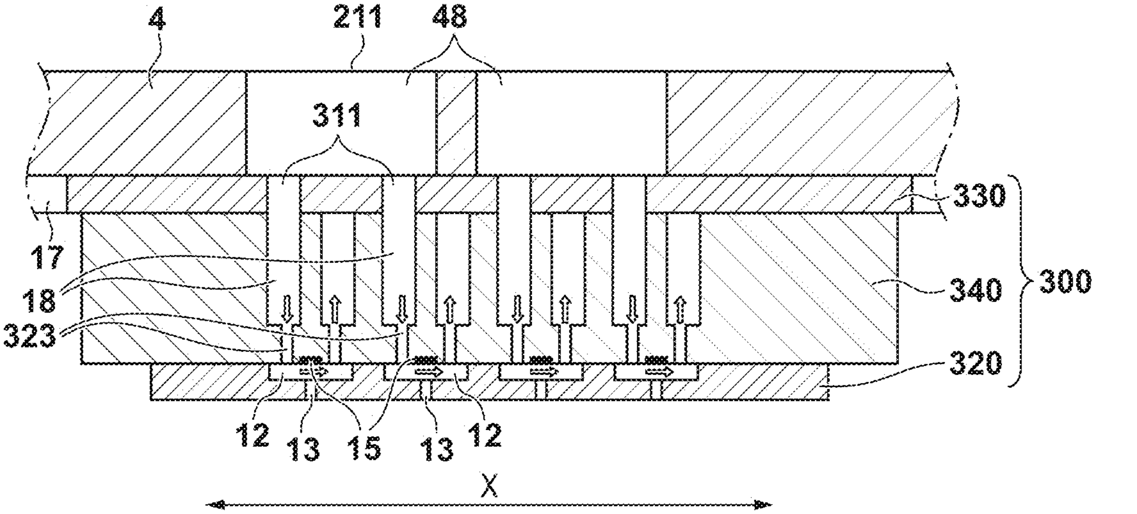
FIGS. 19A to 19C are sectional schematic views showing the flow of ink in the discharge unit.
Figure 19B:
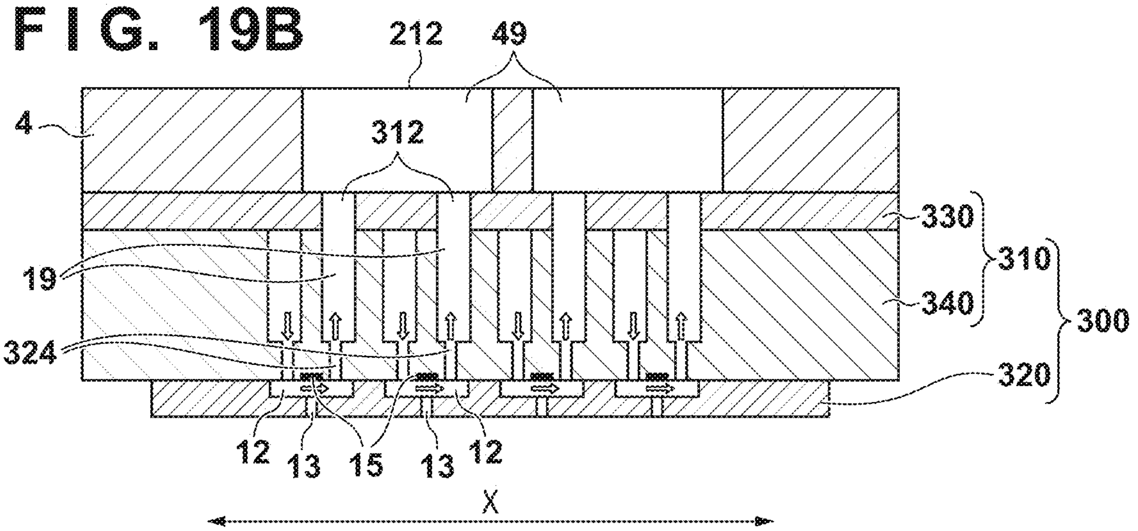
Figure 19C:
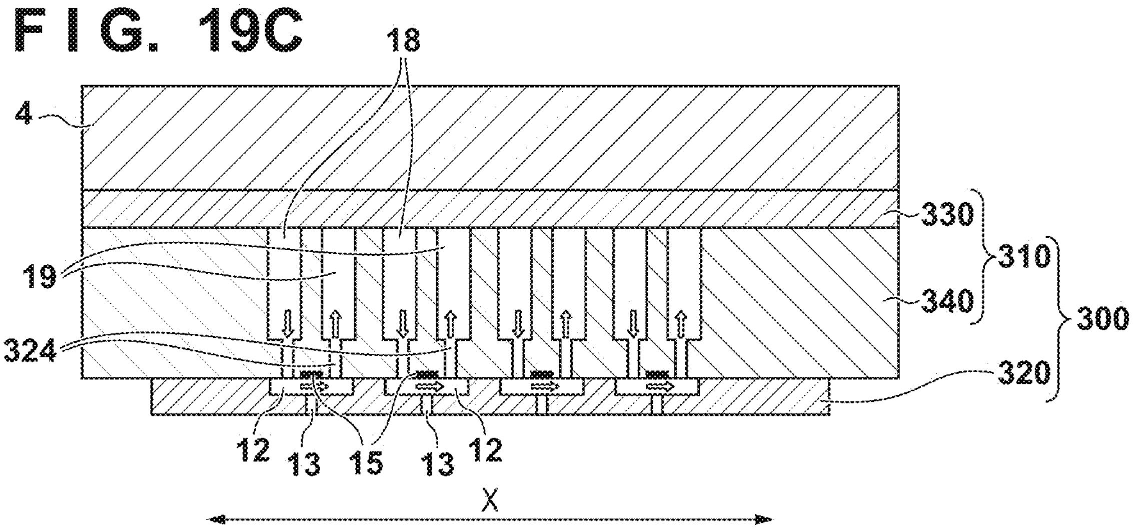

As shown in FIG. 18 and also as shown in FIG. 19A to 19C, in the discharge element substrate 340, a plurality of supply connection channels 323 are arrayed, and a plurality of recovery connection channels 324 are arrayed. The plurality of supply connection channels 323 communicate with the individual supply channels 18, and the plurality of recovery connection channels 324 communicate with the individual recovery channels 19. The ink channels in the discharge unit 3 are formed by making the ink supply channels 48 and the ink recovery channels 49 (see FIG. 5A) provided in the first support member 4 and the channels provided in the discharge module 300 communicate with each other.

In the first support member 4, a plurality of support member supply ports 211 are arrayed as the cross-section openings of the ink supply channels 48, and a plurality of support member recovery ports 212 are arrayed as the cross-section openings of the ink recovery channels 49.

An ink to be supplied to the discharge unit 3 is supplied from the circulation unit 54 to the ink supply channel 48 of the first support member 4 toward the discharge module 300 (see FIGS. 4, 5A, and 9). The ink is supplied to the individual supply channel 18 of the discharge element substrate 340 via the ink supply port 311 of the opening plate 330 and then flows into the supply connection channel 323. The path to this point corresponds to the supply side channel.

After that, the ink flows to the recovery connection channel 324 of the recovery side channel via the pressure chamber 12 (see FIG. 5B) of the orifice forming member 320. Note that details of the ink flow in the pressure chamber 12 will be described later. The ink that flows into the recovery connection channel 324 flows to the individual recovery channel 19, then flows to the ink recovery channel 49 of the first support member 4 via the ink recovery port 312 of the opening plate 330, and is recovered by the circulation unit 54 via the support member recovery port 212.

Note that regions of the opening plate 330 where the ink supply ports 311 and the ink recovery ports 312 are not formed correspond to parts to partition the support member supply ports 211 and the support member recovery ports 212 in the first support member 4. No openings are provided in the first support member 4 in correspondence with these regions, and these regions can be used for adhesion when adhering the discharge module 300 and the first support member 4.

As shown in FIG. 17, in the opening plate 330, a plurality of openings arrayed in the X direction form one line, and a plurality of lines are provided along the Y direction. In the plurality of lines of openings, the openings for supply (IN) and the openings for recovery (OUT) are arrayed in a staggered pattern such that these are shifted in the X direction by, for example, a half of the array pitch.

As shown in FIG. 18, in the discharge element substrate 340, the individual supply channels 18 communicating with the plurality of supply connection channels 323 arrayed in the Y direction and the individual recovery channels 19 communicating with the plurality of recovery connection channels 324 arrayed in the Y direction are alternately arrayed in the X direction. The individual supply channels 18 and the individual recovery channels 19 are divided for each ink type, and the arrangement number of individual supply channels 18 and individual recovery channels 19 is decided in accordance with the number of orifice arrays of each color. Similarly, the supply connection channels 323 and the recovery connection channels 324 are also arranged as many as the number of orifices 13. Note that as for the number, these elements need not always be in a one-to-one correspondence, and one supply connection channel 323 and one recovery connection channel 324 may correspond to two or more orifices 13.

The discharge module 300 is formed by overlaying and joining the opening plate 330 and the discharge element substrate 340 such that the channels of inks communicate with each other, and is supported by the first support member 4, thereby forming the ink channels of the supply channels and the recovery channels described above.

FIGS. 19A to 19C are sectional schematic views showing the flow of ink in different parts of the discharge unit 3.

FIG. 19A shows a sectional view of a part in which the ink supply channels 48 and the ink supply ports 311 communicate. In the ink supply channel, as shown in FIG. 19A, the ink is supplied from a portion where the ink supply channel 48 of the first support member 4 and the ink supply port 311 of the opening plate 330 overlap and communicate.

FIG. 19B shows a sectional view of a part in which the ink recovery channels 49 and the ink recovery ports 312 communicate. In the ink recovery channel, as shown in FIG. 19B, the ink is recovered from a portion where the ink recovery channel 49 of the first support member 4 and the ink recovery port 312 of the opening plate 330 overlap and communicate.

FIG. 19C shows a sectional view of a part in which the ink supply ports 311 and the ink recovery ports 312 do not communicate with the channels in the first support member 4. As shown in FIG. 19C, the opening plate 330 also has regions where no openings are formed. In such a region, ink supply and recovery are not performed, that is, ink supply is performed in regions where the ink supply ports 311 are provided (see FIG. 19A), and ink recovery is performed in regions where the ink recovery ports 312 are provided (see FIG. 19B).

Note that in this embodiment, a configuration using the opening plate 330 has been exemplified, but a mode in which the opening plate 330 is not used is also possible. For example, a configuration in which channels corresponding to the ink supply channels 48 and the ink recovery channels 49 are formed in the first support member 4, and the discharge element substrate 340 is joined to the first support member 4 may be employed.

Figure 20A:
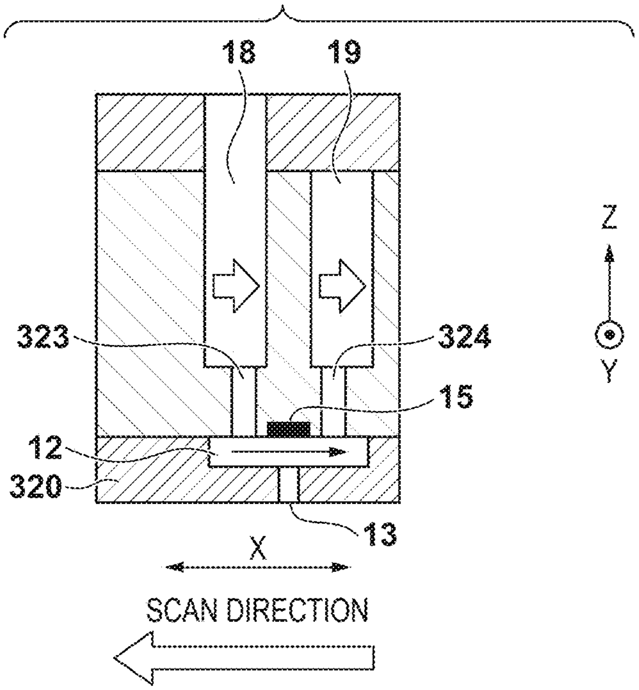
FIGS. 20A and 20B are sectional schematic views showing an example of a structure near an orifice.
Figure 20B:
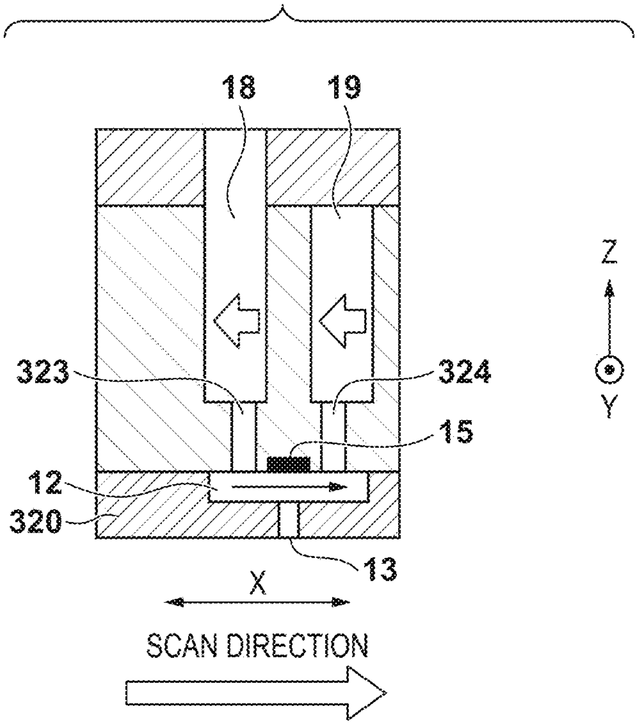

FIGS. 20A and 20B are sectional schematic views concerning the vicinity of the orifice 13 in the discharge module 300. Thick arrows shown in the individual supply channel 18 and the individual recovery channel 19 in FIGS. 20A and 20B indicate the directions of swing of ink in the liquid discharge apparatus 50 including the liquid discharge head 1 that is a serial head.

The ink supplied to the pressure chamber 12 via the individual supply channel 18 and the supply connection channel 323 is discharged from the orifice 13 by driving the discharge element 15. If the discharge element 15 is not driven, the ink is recovered from the pressure chamber 12 to the individual recovery channel 19 via the recovery connection channel 324 that is a recovery channel. When discharging the circulated ink, the ink in the ink channel can swing due to scan of the liquid discharge head 1 during the discharge. This may cause a variation of the ink discharge amount or a variation of the ink discharge direction.

Figure 21A:
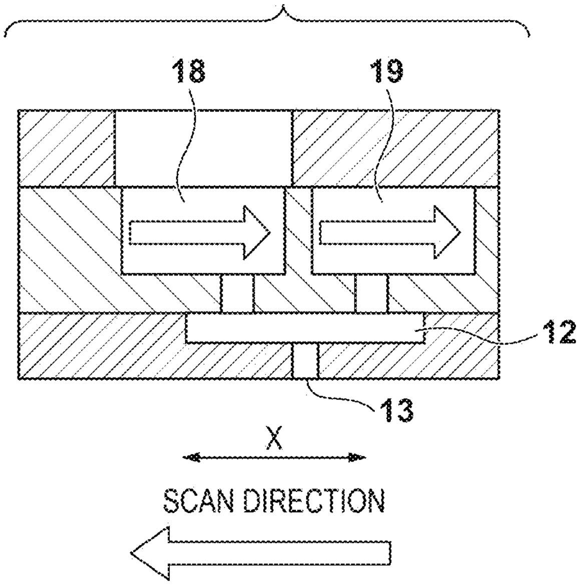
FIGS. 21A and 21B are sectional schematic views showing a comparative example of a structure near an orifice.
Figure 21B:
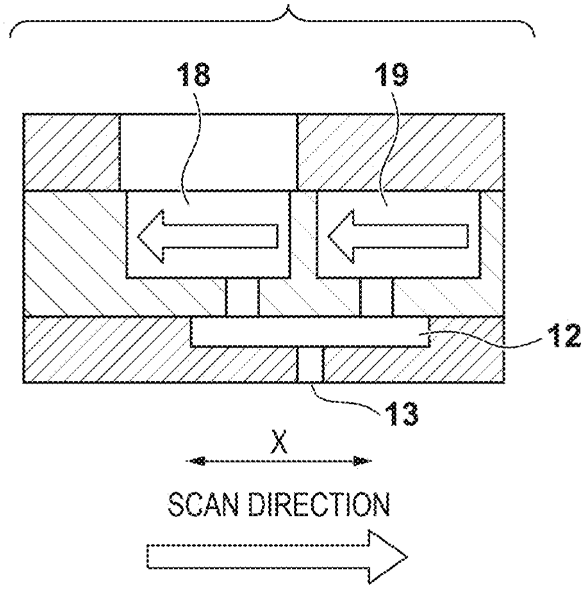

FIGS. 21A and 21B are sectional schematic views of a comparative example in which the individual supply channel 18 and the individual recovery channel 19 are expanded in the X direction. If the individual supply channel 18 and the individual recovery channel 19 each have a sectional shape wide in the X direction that is the scan direction of the liquid discharge head 1, as shown in FIGS. 21A and 21B, the ink in the individual supply channel 18 and the individual recovery channel 19 can relatively largely swing because of the inertial in the scan direction. This may affect ink discharge from the orifice 13. Also, this configuration may impede the nozzle pitch being higher, and may lower the printing efficiency.

In this embodiment, the individual supply channel 18 and the individual recovery channel 19 are formed to extend not in the X direction that is the scan direction but in the Y direction and the Z direction crossing the X direction, as shown in FIGS. 20A and 20B. According to this configuration, the swing of ink in the individual supply channel 18 and the individual recovery channel 19 during scan of the liquid discharge head 1 can be suppressed. This can suppress the influence of ink swing on ink discharge. Also, when the individual supply channel 18 and the individual recovery channel 19 extend in the Z direction, the sectional areas of these can be increased, and a pressure loss can thus be reduced.

Furthermore, in this embodiment, the individual supply channel 18 and the individual recovery channel 19 can be arranged at positions where these overlap each other in the X direction such that the reduced influences of the ink swing equal even between the plurality of types of inks (with respect to the inks of the other colors). Accordingly, the inks can be discharged in the same mode independently of the type.

The supply connection channel 323 and the recovery connection channel 324 are provided in correspondence with the orifice 13 and located side by side in the X direction while sandwiching the orifice 13. If the individual supply channel 18 and the individual recovery channel 19 do not overlap in the X direction, the above-described positional relationship between the supply connection channel 323 and the recovery connection channel 324 cannot be satisfied. This can affect the ink flow in the X direction in the pressure chamber 12 and discharge of the ink. If the swing of ink additionally occurs, this may further affect the ink discharge mode for each orifice 13.

For this reason, when the individual supply channel 18 and the individual recovery channel 19 are arranged at positions where these overlap in the X direction, the ink substantially similarly swings in the individual supply channel 18 and the individual recovery channel 19 during scan in any of the orifices 13 arrayed in the Y direction. It is therefore possible to suppress the variation of the pressure difference that can occur in the pressure chamber 12 between the side of the individual supply channel 18 and the side of the individual recovery channel 19 and stabilize the ink discharge.

Note that if the individual supply channel 18 and the individual recovery channel 19 are arranged close in the X direction, the influence of the ink swing can further be suppressed, and the distance therebetween may be set to, for example, 75 to 100 μm.

In some of such ink circulation type liquid discharge heads 1, the channel for supplying ink to the liquid discharge head 1 and the channel for recovering the ink are formed by the same channel. In this embodiment, however, the individual supply channel 18 and the individual recovery channel 19 are independently formed. The supply connection channel 323 and the pressure chamber 12 communicate with each other, the pressure chamber 12 and the recovery connection channel 324 communicate with each other, the pressure chamber 12 that connects the supply connection channel 323 and the recovery connection channel 324 includes the orifice 13, and ink is discharged from the orifice 13. Hence, an ink flow from the side of the supply connection channel 323 to the side of the recovery connection channel 324 occurs in the pressure chamber 12, and the ink in the pressure chamber 12 is circulated. In general, the ink in the pressure chamber 12 is affected by evaporation at the orifice 13. However, if the ink in the pressure chamber 12 is appropriately circulated, the influence is suppressed, and the quality of the ink in the pressure chamber 12 can be maintained.

Also, the two channels, that is, the individual supply channel 18 and the individual recovery channel 19 communicate with the pressure chamber 12. For this reason, when discharging ink in a relatively large flow amount, the ink can be supplied from both channels. That is, this configuration can not only implement ink circulation but also cope with discharge of the ink in a relatively large flow amount.

Figure 22:
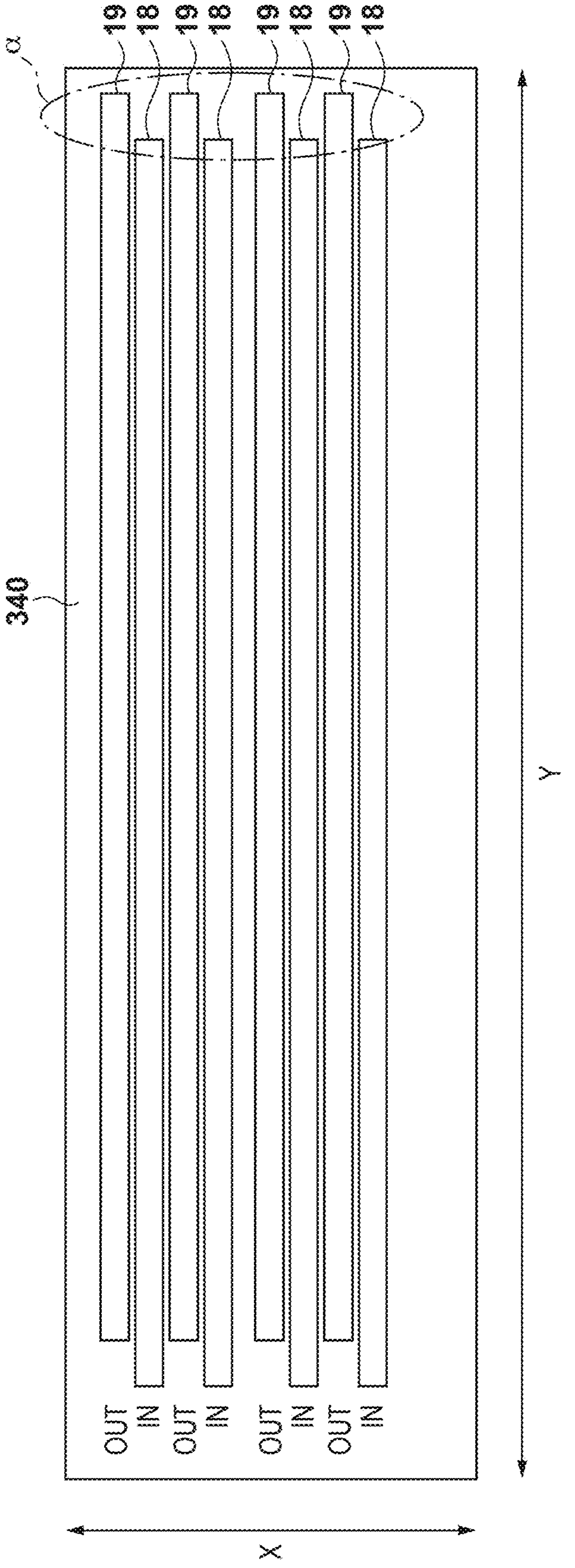
FIG. 22 is a view showing a comparative example of the discharge element substrate.

FIG. 22 is a plan schematic view of the discharge element substrate 340 according to the comparative example. Note that the supply connection channels 323 and the recovery connection channels 324 are omitted in FIG. 22.

Since the ink that has received thermal energy by the discharge element 15 in the pressure chamber 12 flows into the individual recovery channel 19, ink whose temperature is higher than that of the ink in the individual supply channel 18 flows in the individual recovery channel 19. At this time, according to the example shown in FIG. 22, which is a comparative example, of the individual supply channels 18 and the individual recovery channels 19, only the individual recovery channels 19 substantially exist in a portion of the discharge element substrate 340 in the X direction, like a portion a indicated by an alternate long and short dashed line. In this configuration, the temperature locally becomes high in this portion, resulting in temperature unevenness in the discharge module 300 and an influence on the ink discharge.

Ink whose temperature is lower than that of the ink in the individual recovery channel 19 flows in the individual supply channel 18. For this reason, if the individual supply channel 18 and the individual recovery channel 19 are adjacent, heat exchange occurs between the individual supply channel 18 and the individual recovery channel 19, and a temperature rise can be suppressed near these. It is therefore preferable that the individual supply channel 18 and the individual recovery channel 19 have substantially the same length, and these exist at positions overlapping each other in the X direction and are adjacent to each other.

Figure 23A:
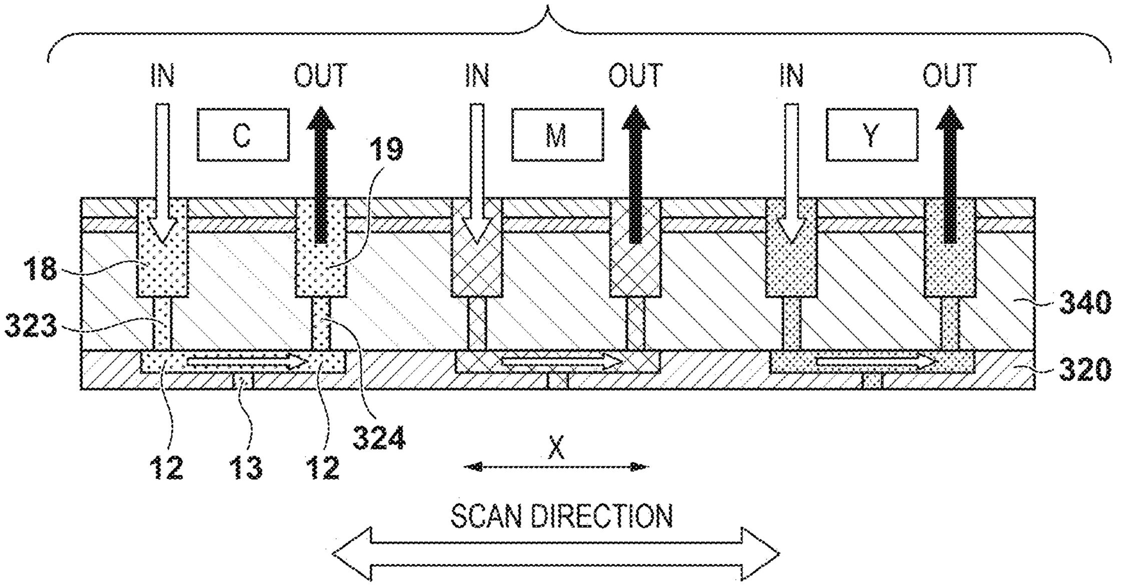
FIGS. 23A and 23B are sectional schematic views showing the flows of inks of other colors.
Figure 23B:
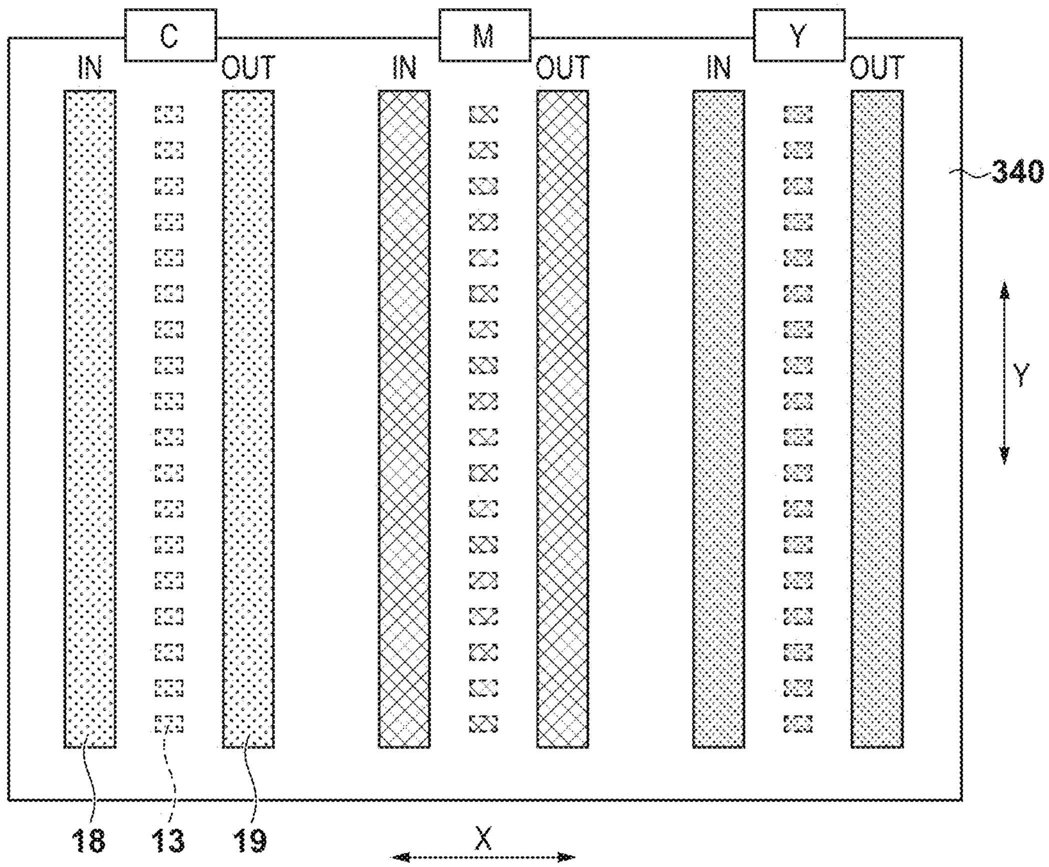

FIGS. 23A and 23B show the channels of inks of three, C, M, and Y colors in the liquid discharge head 1. As shown in FIG. 23A, the circulation path is provided for each ink type in the liquid discharge head 1. The pressure chambers 12 are provided along the X direction that is the scan direction of the liquid discharge head 1. Also, as shown in FIG. 23B, the individual supply channels 18 and the individual recovery channels 19 are provided along orifice arrays in which the orifices 13 are arrayed, and are extended in the Y direction such that each orifice array is sandwiched between the individual supply channel 18 and the individual recovery channel 19.

If a relatively long time elapses without performing ink circulation, the solid component of the ink sediments and is deposited in the channel of the ink. This may impede the ink flow in the channel or impede appropriate discharge of ink from the orifice 13.

Figure 24:
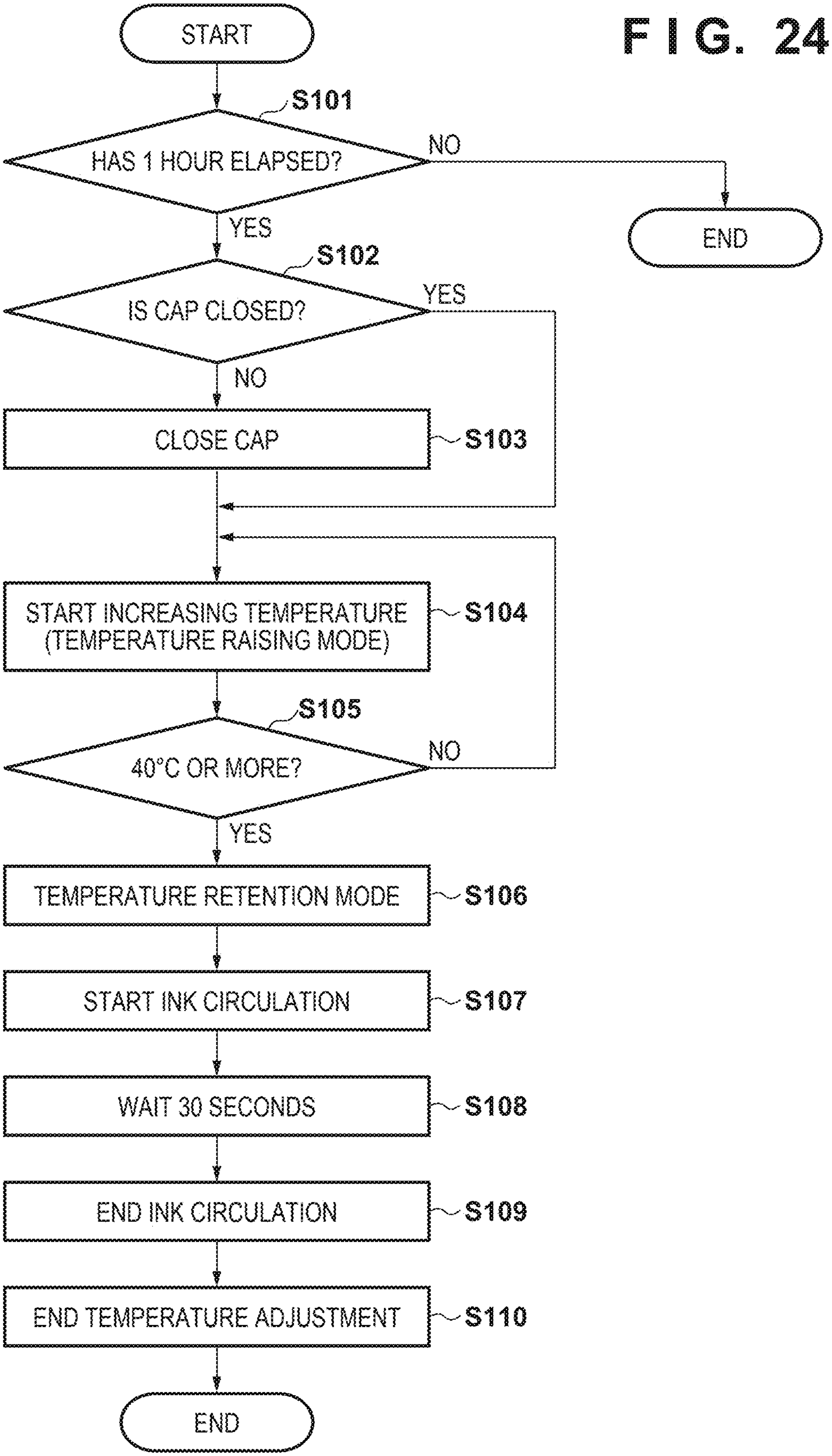
FIG. 24 is a flowchart of control for driving the circulation pump.

FIG. 24 is a flowchart of control for driving the circulation pump 500 as one of recovery operations. This flowchart can mainly be executed by the CPU 100. This processing is performed for ink that readily sediments (in this embodiment, W ink (white ink)).

In step S101 (to be simply referred to as "S101" hereinafter, and this also applies to the remaining steps to be described later), it is determined whether the elapsed time from preceding ink circulation satisfies a reference (1 hr in this example). The elapsed time can be acquired by the timer 35. If the elapsed time from preceding ink circulation satisfies the reference, the process advances to S102. Otherwise, the flowchart is ended.

In S102, it is determined whether the cap 411 is in the closed state in which it caps the nozzle surface of the liquid discharge head 1. If the cap 411 is in the closed state, the process advances to S104. Otherwise (if the cap 411 is in the open state), the process advances to S103. In S103, the cap 411 is set in the closed state. This can prevent the ink from evaporating.

Here, the measurement of the elapsed time by the timer 35 is performed always (for example, in the sleep state of the liquid discharge apparatus 50 or during a power-off state), and when the process advances to S102, the measured value of the timer 35 is reset, and re-measurement may be started.

In S104, the sub-heater 14 is driven to heat the ink.

In S105, it is determined whether the ink temperature reaches a target temperature (40° C. in this example). If the ink temperature reaches the target temperature, the process advances to S106. Otherwise, the process returns to S104. The ink temperature can be acquired based on the detection results of the temperate sensors S1 to S9.

The operation in S104 and S105 can be said as a temperature raising operation for raising the ink temperature to the target temperature, and the operation mode during this can be said as a temperature raising mode.

In S106, the operation mode is changed from the temperature raising mode to a temperature retention mode, and the ink temperature is maintained at the target temperature (40° C. in this example). The temperature retention mode need only be implemented based on the detection results of the temperate sensors S1 to S9. That is, if the ink temperature is less than 40° C., the sub-heater 14 is driven. If the ink temperature is 40° C. or more, the drive is suppressed.

The operation in S106 can be said as a temperature adjusting operation for setting the ink temperature to the target temperature, together with the operation in S104 and S105.

In S107, the circulation pump 500 is driven to start ink circulation.

In S108, the processing waits until a predetermined time (30 sec in this example) elapses from the start of ink circulation.

In S109, the circulation pump 500 is stopped to end the ink circulation.

In S110, the drive of the sub-heater 14 is stopped to stop the ink temperature adjustment and end the flowchart.

FIGS. 25A1 to 25B3 are schematic views of the discharge module 300 showing a state in which a deposit D of a solid component that has sedimented and is deposited in ink is eliminated by ink circulation of the circulation pump 500, and showing states corresponding to the steps of the above-described flowchart. FIGS. 25A1 to 25A3 show a state of ink circulation in a case where the temperature adjusting operation in S104 to S106 is not performed, and FIGS. 25B1 to 25B3 show a state of ink circulation in a case where the temperature adjusting operation is performed.

FIG. 25A1 shows a state after a reference time (1 hr in this example) elapses from the stop of preceding ink circulation, and show a state in which the circulation pump 500 is stopped. If the standing state continues after the stop of ink circulation, the solid component of the ink sediments, and the deposit (sediment) D can thus appear mainly on the flat portion in the channel.

FIG. 25A2 shows a state in which ink circulation is performed by driving the circulation pump 500. Arrows in FIG. 25A2 indicate the direction of ink flowing by ink circulation. In this example, the temperature adjusting operation is not performed. The ambient temperature is 25° C., that is, both the temperature of the liquid discharge head 1 and the ink temperature are 25° C. When the ink flows, the deposit D gradually dissolves and becomes small.

FIG. 25A3 shows a state in which the deposit D is wholly eliminated. In this example in which ink circulation is performed without performing the temperature adjusting operation, the time required to eliminate the deposit D is about 1 min.

FIG. 25B1 shows a state after the reference time elapses from the stop of preceding ink circulation, and show a state in which the circulation pump 500 is stopped, like FIG. 25A1.

FIG. 25B2 shows a state in which ink circulation is performed by driving the circulation pump 500. In this example, ink circulation is started in a state in which the ink temperature equals the target temperature (40° C. in this example), and the viscosity of the ink lowers. For this reason, as indicated by thick arrows in FIG. 25B2, the flow amount (circulation amount) of ink is large, and ink circulation can easily be performed.

FIG. 25B3 shows a state in which the deposit D is wholly eliminated. In this example in which the temperature adjusting operation is performed, and ink circulation is performed, since the flow amount of ink is large, the time required to eliminate the deposit D is shortened to about 30 sec.

Also, in a case where a relatively long time elapses without ink circulation for an ink other than white ink as well, circulation may be performed.

For example, in a case of an ink for which the influence of an increase of the viscosity of the ink after left stand is small, in a state in which the cap is closed after the elapse of a predetermined time (for example, after the elapse of 1 hr), circulation may be performed without performing temperature raising. Alternatively, circulation may be started in a state in which the cap is closed, and temperature raising may be started after that.

Also, in a case of an ink for which an increase of the viscosity of the ink after left stand has an influence, temperature raising may be started in a state in which the cap is closed, and circulation may be started after that.

Control may be done by combining these. For example, if a predetermined time elapses in a state in which the cap is open, assuming that an increase of the viscosity of the ink after left stand has an influence, temperature raising may be started in a state in which the cap is closed, and circulation may be started after that. If a predetermined time elapses in a state in which the cap is closed, in a state in which the cap is closed, circulation may be performed without performing temperature raising. Alternatively, control may be changed assuming that an increase of the viscosity of the ink after left stand has an influence if the temperature of the environment in which the apparatus is placed is high, and the influence of an increase of the viscosity of the ink is small if the temperature is low.

As described above, the deposit D that can be deposited in the channel in a case where a relatively long time elapses without performing ink circulation is eliminated by ink circulation using the circulation pump 500 so that the recovery operation can be executed. During the ink circulation, since the cap 411 is in the closed state, evaporation of ink can be suppressed. Also, in the ink circulation, since the viscosity of the ink is lowered by adjusting the ink temperature, and the flow amount of the ink is thus increased, the time until the deposit D is eliminated can be shortened, and the circulation pump 500 need not be wastefully driven for a long time.

Hence, according to this embodiment, it is advantageous in improving the quality of printing by the liquid discharge apparatus 50 and also advantageous in increasing the life of the circulation pump 500.

Second Embodiment

Figure 26:
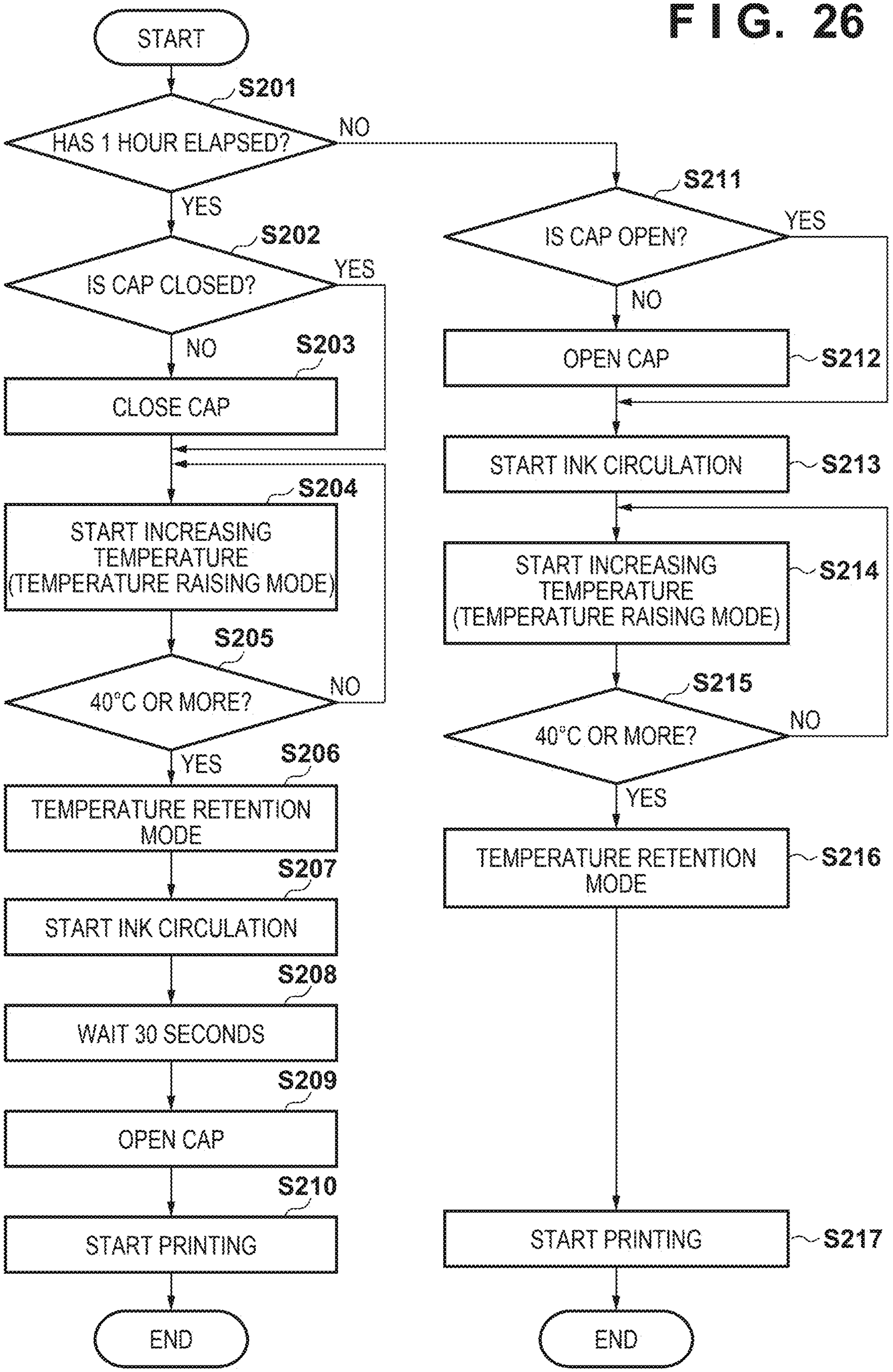
FIG. 26 is a flowchart of control for driving a circulation pump.

FIG. 26 is a flowchart concerning a recovery operation for eliminating a deposit D according to the second embodiment. This flowchart can mainly be executed by a CPU 100.

In S201, it is determined whether the elapsed time from preceding ink circulation satisfies a reference (1 hr in this example), like S101. The elapsed time can be acquired by a timer 35. If the elapsed time from preceding ink circulation satisfies the reference, the process advances to S202. Otherwise, the process advances to S211.

S202 to S208 are the same as S102 to S108, respectively.

In S209, a cap 411 is set in an open state. After that, in S210, printing is started, and the flowchart is ended.

In S211, it is determined whether the cap 411 is in the open state. If the cap 411 is in the open state, the process advances to S213. Otherwise (if the cap 411 is in the closed state), the process advances to S212. In S212, the cap 411 is set in the open state to enable quick start of printing after completion of ink circulation later.

In S213, ink circulation is started by driving a circulation pump 500.

S214 to S216 are the same as S204 to S206 (or S104 to S106), respectively.

In S217, printing is started, and the flowchart is ended.

Figure 27:
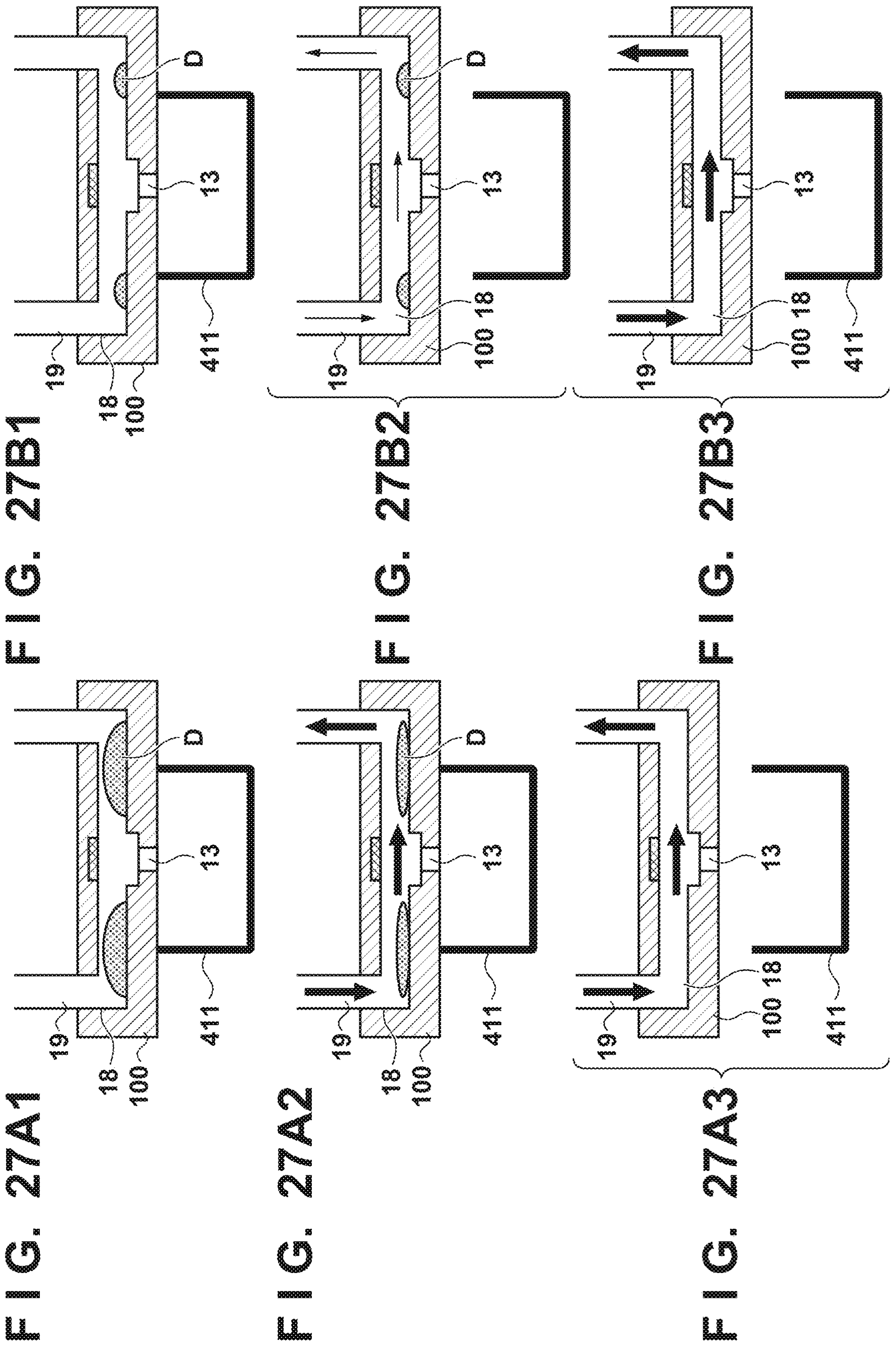

FIGS. 27A1 to 27B3 are schematic views of a discharge module 300 showing a state in which a deposit D is eliminated by ink circulation of the circulation pump 500, and showing states corresponding to the steps of the above-described flowchart. FIGS. 27A1 to 27A3 show the states of S202 to S210 in a case where the elapsed time from preceding ink circulation satisfies a reference (1 hr in this example), and FIGS. 27B1 to 27B3 show the states of S211 to S217 in a case where the elapsed time does not satisfy the reference.

As shown in FIGS. 27A1 to 27A2, ink circulation is performed in which the ink temperature equals the target temperature (40° C. in this example), and the viscosity of ink lowers, and the flow amount (circulation amount) of the ink increases, as in FIGS. 25B1 and 25B2. Hence, the deposit D can be eliminated in a relatively short time (for example, 30 sec).

As shown in FIG. 27A3, after the deposit D is wholly eliminated, the cap 411 is set in the open state, and printing is started. This makes it possible to quickly shift to a printing operation and prevent wasteful evaporation of ink. Also, since the ink temperature is set to the target temperature by a temperature adjusting operation, the viscosity of the ink at this time is sufficiently low, and printing can appropriately be implemented.

In general, the printing operation is required to be quickly started. If the elapsed time from preceding ink circulation does not satisfy the reference (1 hr in this example), as shown in FIG. 27B1, the deposit D is relatively small. In this case, control can be performed such that the printing operation can more quickly be started rather than eliminating the relatively small deposit D.

As shown in FIG. 27B2, the relatively small deposit D can be eliminated by performing ink circulation without performing the temperature adjusting operation (that is, without increasing the flow amount of the ink by temperature raising), and ink evaporation can be suppressed even if the cap 411 is in the open state.

After that, as shown in FIG. 27B3, the relatively small deposit D has been eliminated when starting printing, the ink can appropriately be discharged by the temperature adjusting operation, and printing can quickly be started.

Figure 28:
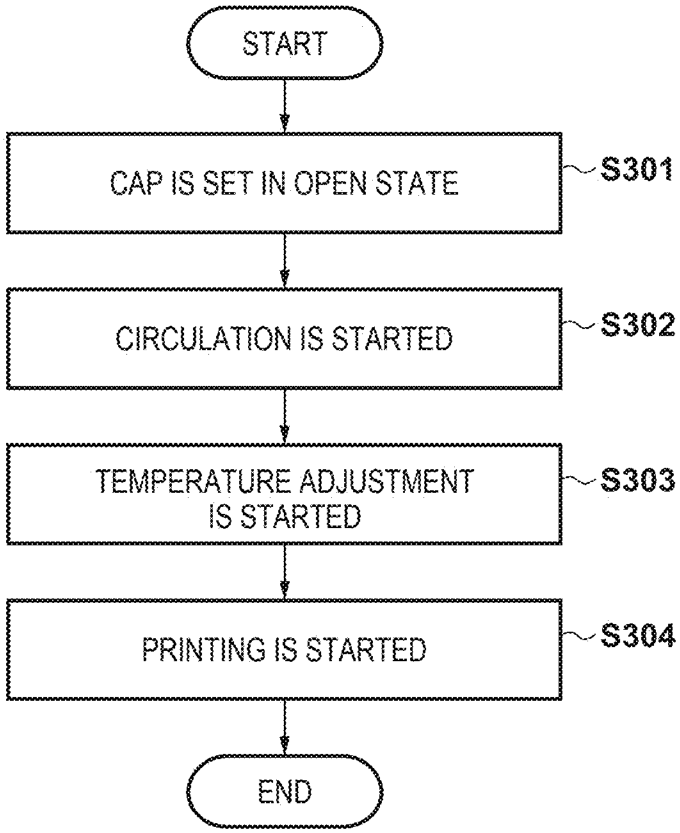
FIG. 28 is a flowchart of control for driving a circulation pump.

For inks other than white ink, processing shown in FIG. 28 is performed before printing. In this processing, circulation and temperature adjustment are executed in this order to prevent nozzle dry/fixing. To shorten time until the start of printing, circulation is performed in the cap open state. This flowchart can mainly be executed by the CPU 100.

In S301, the cap 411 is set in the open state to enable quick start of printing after completion of ink circulation later.

In S302, ink circulation is started by driving the circulation pump 500.

In S303, the ink is heated by driving a sub-heater 14.

In S304, printing is started, and the flowchart is ended.

According to this embodiment, the same effects as those of the above-described first embodiment can be obtained, and the execution order of ink circulation and the temperature adjusting operation is changed based on the elapsed time from preceding ink circulation. This makes it possible to improve the quality of printing by a liquid discharge apparatus 50 in consideration of the preparation time needed before the start of printing and the discharge mode of ink associated with it.

Other Embodiments

According to the above-described embodiments, the deposit D that can be formed in the circulation path (mainly on the flat portion in the channel) of ink depending on the elapsed time from preceding ink circulation can easily be eliminated by circulating a relatively large flow amount of ink that obtains a relatively low viscosity by temperature adjustment. Various modifications can be added to the embodiments without departing the scope of these.

For example, in the embodiments, a case where the liquid discharge head 1 is a serial head has been exemplified. However, the contents of the embodiments can also be applied to a case of a line head capable of printing the whole region of the print medium P in the widthwise direction at once. If a line head is employed, and the circulation mechanism or circulation system configured to implement ink circulation becomes bulky, the circulation pump 500 may be provided separately from the liquid discharge head 1. That is, ink circulation according to the embodiment can be implemented in various liquid discharge apparatuses 50. The circulation pump 500 need not always be a piezoelectric diaphragm pump, and another known pump configuration such as a tube pump may be employed.

Similarly, the circulation mechanism configured to implement ink circulation exemplified above is not limited to this example, and a part/whole of the circulation path or the circulation unit 54 or a part/whole of mechanisms associated with it/these can be modified without departing from the scope of it/these.

Also, the execution time of the temperature adjusting operation for setting ink to the target temperature may be adjusted in accordance with the ambient temperature. For example, the execution time may be shortened if the ambient temperature is high, and may be prolonged if the ambient temperature is low. The execution time of the temperature adjusting operation may be adjusted in accordance with an ingredient of ink. For example, the execution time of the temperature adjusting operation may be shorter if a pigment of relatively small particles is contained as an ingredient, and may be prolonged if a pigment of relatively large particles is contained.

With the same purpose, the target temperature may be adjusted. The target temperature may be set low in place of or in addition to shortening the execution time of the temperature adjusting operation, and the target temperature may be set high in place of or in addition to prolonging the execution time of the temperature adjusting operation. At this time, to prevent the quality of ink from changing due to the high temperature, the target temperature may be changed based on the ingredient of the ink. Note that as the target temperature, a value that substantially exerts no influence of heating on peripheral devices such as the cap 411 is set.

Others

In the embodiments, elements are named using expressions based on their main functions. However, the functions described in the embodiments may be sub-functions, and are not strictly limited to the expressions. Also, each expression can be replaced with a similar expression. With the same purpose, an expression "unit or portion" can be replaced with "means", "tool", "component", "member", "structure", "assembly", or the like. Alternatively, these may be omitted or added.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-099541, filed Jun. 16, 2023, and Japanese Patent Application No. 2024-082897, filed May 21, 2024, which are hereby incorporated by reference herein in their entirety.

What is claimed is:

1. A liquid discharge apparatus comprising:
- a liquid discharge head including a nozzle capable of discharging a liquid;
- a circulation mechanism configured to circulate the liquid supplied to the liquid discharge head;
- a heating element configured to perform temperature adjustment of the liquid circulated by the circulation mechanism;
- a temperature sensor configured to detect a temperature of the liquid circulated by the circulation mechanism; and
- a cap capable of capping the nozzle that discharges the liquid in the liquid discharge head,
- wherein the circulation mechanism circulates the liquid based on a detection result of the temperature sensor in a state in which the nozzle is capped by the cap,
- the circulation mechanism circulates the liquid, after the liquid is heated by the heating element and reaches a target temperature, if an elapsed time from preceding circulation of the liquid satisfies a reference,
- the cap caps the nozzle based on whether the elapsed time satisfies the reference, and
- based on whether the elapsed time satisfies the reference, the heating element heats the liquid before or after the circulation of the liquid by the circulation mechanism.

2. The apparatus according to claim 1, wherein the liquid discharge head discharges the liquid after the circulation of the liquid by the circulation mechanism.

3. The apparatus according to claim 1, wherein a time of circulation of the liquid by the circulation mechanism is adjusted based on a temperature of the liquid and/or an ingredient of the liquid.

4. The apparatus according to claim 1, wherein a target temperature of the liquid heated by the heating element is adjusted based on a temperature of the liquid and/or an ingredient of the liquid.

5. The apparatus according to claim 1, wherein
- when starting printing of an image, if a predetermined time has elapsed since the preceding circulation of the liquid, the circulation mechanism circulates the liquid in a state in which the nozzle is capped by the cap, and
- when starting printing of an image, if the predetermined time has not elapsed since the preceding circulation of the liquid, the circulation mechanism circulates the liquid in a state in which capping of the nozzle by the cap is canceled.

6. A liquid discharge apparatus comprising:
- a liquid discharge head including a nozzle capable of discharging a liquid;
- a circulation mechanism configured to circulate the liquid supplied to the liquid discharge head;

a heating element configured to perform temperature adjustment of the liquid circulated by the circulation mechanism;

a temperature sensor configured to detect a temperature of the liquid circulated by the circulation mechanism; and a cap capable of capping the nozzle that discharges the liquid in the liquid discharge head, wherein the circulation mechanism circulates the liquid based on a detection result of the temperature sensor in a state in which the nozzle is capped by the cap, when starting printing of an image, if a predetermined time has elapsed since the preceding circulation of the liquid, circulation of the liquid by the circulation mechanism is performed after temperature adjustment by the heating element is started, and when starting printing of an image, if the predetermined time has not elapsed since the preceding circulation of the liquid, temperature adjustment by the heating element is performed after circulation of the liquid by the circulation mechanism is started.

7. A liquid discharge apparatus comprising:

a liquid discharge head including nozzles capable of discharging liquid;

a circulation mechanism configured to circulate the liquid supplied to the liquid discharge head;

a heating element configured to perform temperature adjustment of the liquid circulated by the circulation mechanism;

a temperature sensor configured to detect a temperature of the liquid circulated by the circulation mechanism; and a cap capable of capping the nozzles that discharges the liquid in the liquid discharge head, wherein the circulation mechanism circulates the liquid based on a detection result of the temperature sensor in a state in which the nozzle is capped by the cap, the apparatus includes a nozzle capable of discharging black ink and a nozzle capable of discharging white ink, and when starting printing of an image, for the white ink, circulation of the liquid by the circulation mechanism is performed after temperature adjustment by the heating element is started, and for the black ink, temperature adjustment by the heating element is performed after circulation of the liquid by the circulation mechanism is started.

8. The apparatus according to claim 7, wherein the apparatus further includes a nozzle capable of discharging a color ink, and when starting printing of an image, for the color ink, temperature adjustment by the heating element is performed after circulation of the liquid by the circulation mechanism is started.

* * * * *